US011746930B2

(12) United States Patent
Vaccaro et al.

(10) Patent No.: US 11,746,930 B2
(45) Date of Patent: Sep. 5, 2023

(54) HANGERS AND CLAMPS FOR MOUNTING CABLES

(71) Applicant: CommScope Technologies LLC, Hickory, NC (US)

(72) Inventors: Ronald A. Vaccaro, Taylorsville, NC (US); Aviral Joshi, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/675,836

(22) Filed: Feb. 18, 2022

(65) Prior Publication Data

US 2022/0282806 A1 Sep. 8, 2022

Related U.S. Application Data

(60) Provisional application No. 63/211,221, filed on Jun. 16, 2021, provisional application No. 63/155,943, filed on Mar. 3, 2021.

(51) Int. Cl.
*F16L 3/00* (2006.01)
*F16L 3/22* (2006.01)
(Continued)

(52) U.S. Cl.
CPC ............. *F16L 3/222* (2013.01); *F16L 3/1075* (2013.01); *H02G 3/32* (2013.01)

(58) Field of Classification Search
None
See application file for complete search history.

(56) References Cited

U.S. PATENT DOCUMENTS 6,561,466 B1 * 5/2003 Myers .................... F16L 3/221 248/68.1
7,175,138 B2 2/2007 Low et al.
(Continued)

FOREIGN PATENT DOCUMENTS

EP 1406363 A1 * 4/2004 ............. H02G 7/053
EP 1596483 A1 * 11/2005 ............... H02G 3/32
(Continued)

OTHER PUBLICATIONS

"International Search Report and Written Opinion corresponding to International Application No. PCT/US022/017204 dated Jun. 7, 2022".

*Primary Examiner* — Steven M Marsh
(74) *Attorney, Agent, or Firm* — Myers Bigel, P.A.

(57) ABSTRACT

A cable hanger includes: first and second hanger members, the first hanger member having first securing features and the second hanger member having second securing features that engage the first securing features to secure the first and second hanger members in a mated condition; the first hanger member having a first side wall with a first cutout area and a second side wall with a second cutout area; the second hanger member having a third side wall with a third cutout area and a fourth side wall with a fourth cutout area; wherein in the mated condition the first, second, third and fourth cutout areas form a first cable cavity; and wherein a first cantilevered gripping member extends from the first side wall into the first cable cavity, and a second cantilevered gripping member extends from the third side wall into the first cable cavity.

15 Claims, 19 Drawing Sheets

(51) Int. Cl.
*H02G 3/32* (2006.01)
*F16L 3/10* (2006.01)

(56) References Cited

U.S. PATENT DOCUMENTS

| | | | | |
|---|---|---|---|---|
| 8,191,836 | B2 | 6/2012 | Korczak | |
| 9,866,004 | B2 | 1/2018 | Vaccaro et al. | |
| 10,655,374 | B2 * | 5/2020 | Fukumoto | F16L 3/237 |
| 2004/0061030 | A1 | 4/2004 | Goodwin et al. | |
| 2005/0247829 | A1 * | 11/2005 | Low | H02G 3/263 |
| | | | | 248/68.1 |
| 2007/0128939 | A1 * | 6/2007 | Low | H02G 3/30 |
| | | | | 439/607.41 |
| 2018/0205213 | A1 | 7/2018 | Varale | |
| 2022/0094148 | A1 * | 3/2022 | Hüppi-Ziegler | F16L 3/2235 |

FOREIGN PATENT DOCUMENTS

| | | | | |
|---|---|---|---|---|
| EP | 3473909 | A1 * | 4/2019 | |
| KR | 20140005749 | U | 11/2014 | |
| WO | 2009152363 | A2 | 12/2009 | |
| WO | WO-2017060199 | A1 * | 4/2017 | F16L 3/237 |

* cited by examiner

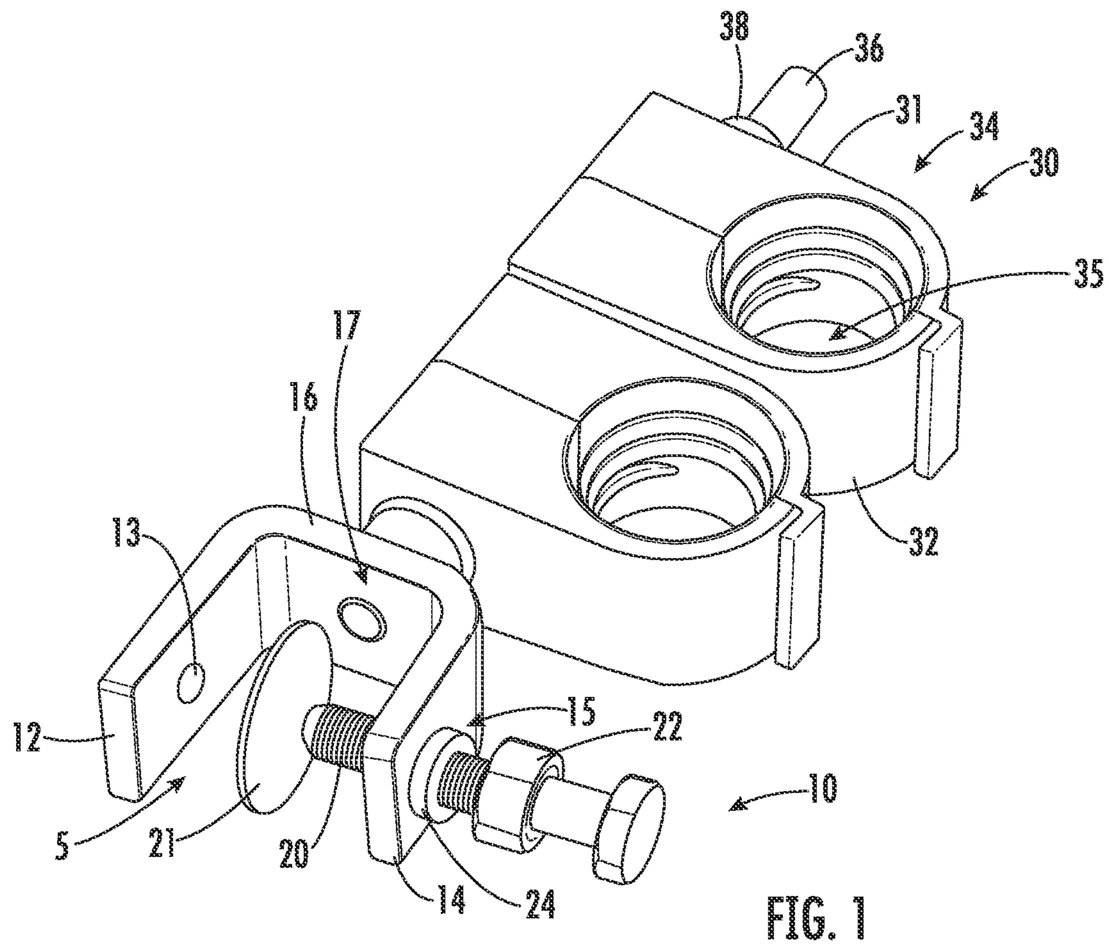
FIG. 1
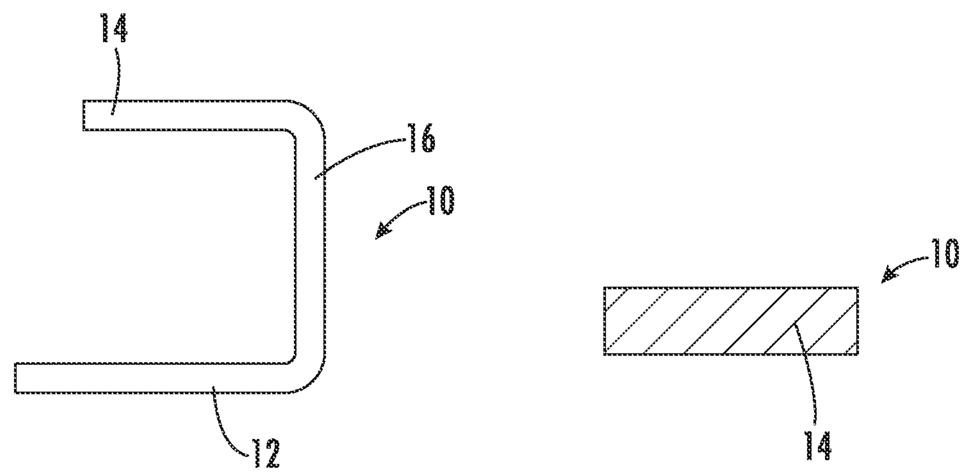
FIG. 2A
FIG. 2B

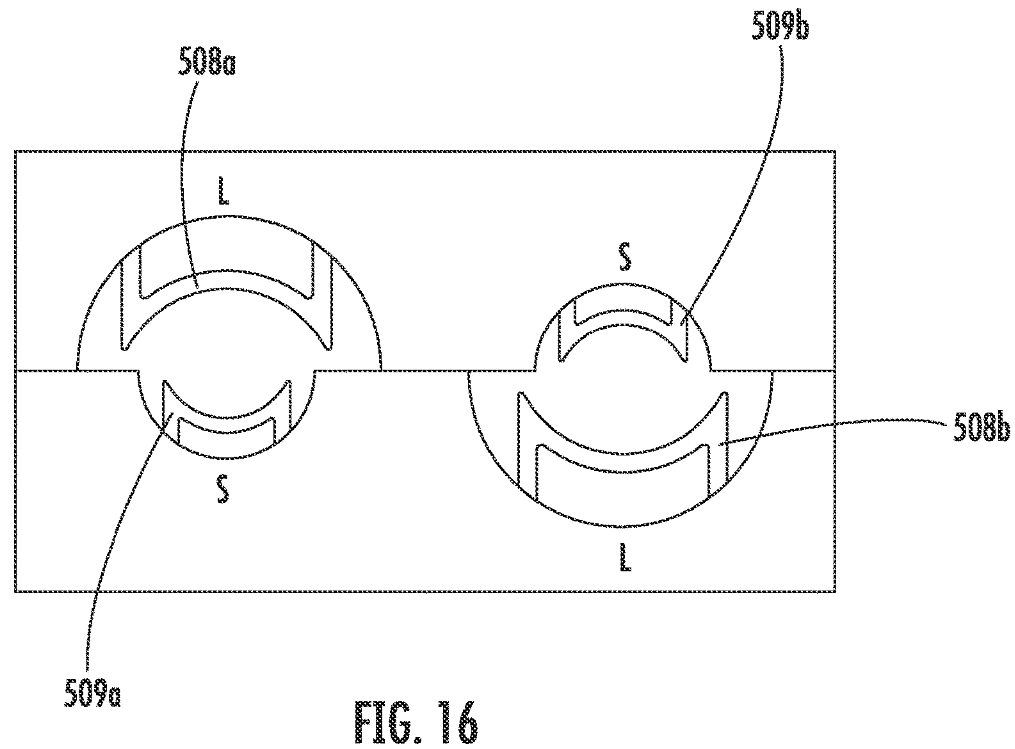
FIG. 16
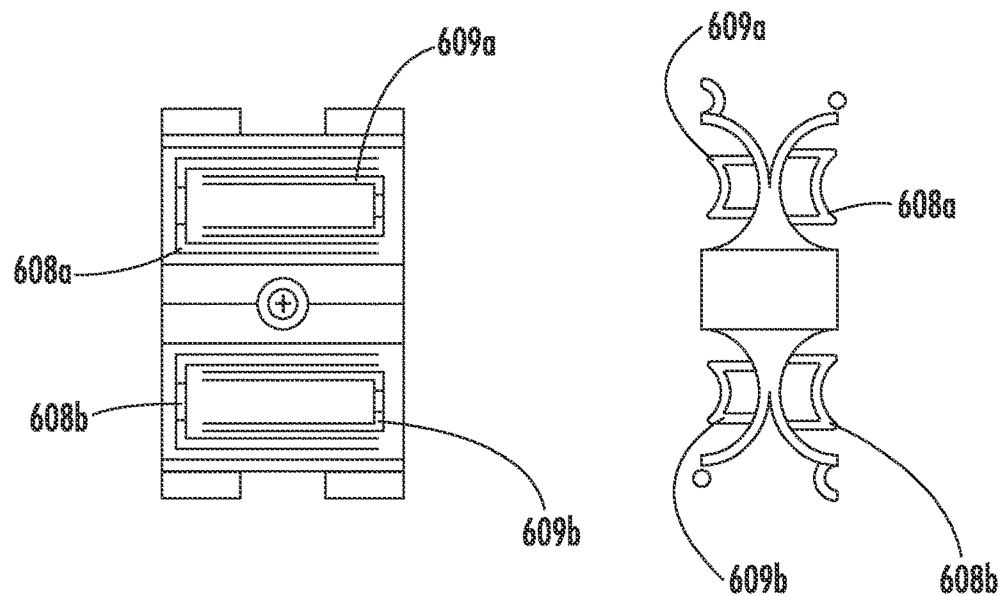
FIG. 17A
FIG. 17B

HANGERS AND CLAMPS FOR MOUNTING CABLES

RELATED APPLICATIONS

This application claims priority from and the benefit of U.S. Provisional Patent Application Nos. 63/155,943, filed Mar. 3, 2021, and 63/211,221, filed Jun. 16, 2021, the disclosures of which are incorporated herein by reference in full.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the aims to engage the cable. Hangers can be "stacked" onto each other by inserting the locking projections of one hanger into the large aperture of the next hanger. Other hangers of this type are discussed in, for example, U.S. Pat. No. 9,866,004 to Vaccaro, the disclosure of which is hereby incorporated herein by reference in full.

Another variety of cable hanger is a clamshell-style hanger, in which two "halves" of a hanger come together to form a cavity; the cable resides within the cavity, and separate halves clamp onto the cable. The halves may be separable, or may be attached with a hinge. Once the halves are brought together, pairs of halves may be stacked upon each other. An exemplary version of a clamshell-style hanger is discussed in U.S. Pat. No. 7,175,138 to Low et al., the disclosure of which is hereby incorporated by reference herein in its entirety. Another is available from CommScope Technologies, LLC (Hickory, N.C.) under the part designations SHK, DHK, and BHD. It may be desirable to provide additional cable hanger configurations.

SUMMARY OF THE INVENTION

As a first aspect, embodiments of the invention are directed to a C-clamp assembly for a cable hanger comprising: a base having opposed ends; first and second arms, each of the first and second arms attached to a respective end of the base and extending in a first direction; a clamping member that extends through the first arm; and a mounting member attached to the base and extending in a second direction opposite the first direction. The base, first arm and second arm are formed as a unitary component. The base, first arm and second arm have a cross-section defined by a width and a thickness, the cross-section includes a central segment and first and second lateral segments, and the first and second lateral segments are offset in the thickness direction from the central segment.

As a second aspect, embodiments of the invention are directed to a c-clamp assembly for a cable hanger comprising: a base having opposed ends; first and second aims, each of the first and second arms attached to a respective end of the base and extending in a first direction; a clamping member that extends through the first arm; and a mounting member attached to the base and extending in a second direction opposite the first direction. The base, first arm and second arm are formed as a unitary component. The base, first arm and second arm have a cross-section defined by a width and a thickness, the cross-section includes a central segment and first and second lateral segments, and the first and second lateral segments are offset in the thickness direction from the central segment.

As a third aspect, embodiments of the invention are directed to a hanger member for a cable hanger comprising: a first side wall having first and second cutout areas; a second side wall having a third cutout area; a third side wall having a fourth cutout area; first and second gripping members extending from the first side wall from locations adjacent, respectively, the first and second cutout areas; a third gripping member extending from the second side wall from a location adjacent the third cutout area; a fourth gripping member extending from the third side wall from a location adjacent the fourth cutout area, wherein the second and third side walls are coplanar; and first and second securing features configured to engage each other, such that a second identical hanger member can he mated to the hanger member to form a cable hanger via engagement of the second securing features of the hanger member with the first securing features of the second identical hanger member.

As a fourth aspect, embodiments of the invention are directed to a hanger member for a cable hanger comprising: a first side wall having first and second cutout areas; a second side wall having a third cutout area; a third side wall having a fourth cutout area; first and second gripping members extending from the first side wall from locations adjacent, respectively, the first and second cutout areas; a third gripping member extending from the second side wall from a location adjacent the third cutout area; a fourth gripping member extending from the third side wall from a location adjacent the fourth cutout area, wherein the second and third side walls are coplanar; and first and second securing features configured to engage each other, such that a second identical hanger member can be mated to the hanger member to form a cable hanger via. engagement of the second securing features of the hanger member with the first securing features of the second identical hanger member.

As a fifth aspect, embodiments of the invention are directed to a hanger member for a cable hanger comprising: a first side wall having first, second, third and fourth cutout areas; a second side wall having a fifth, sixth, seventh and eighth cutout areas; first, second, third and fourth gripping members extending from the first side wall from locations adjacent, respectively, the first, second, third and fourth cutout areas; first and second end walls that span the first and second side walls; first and second clips and first and second pins mounted on the first end wall; and third and fourth clips and third and fourth pins mounted on the second side wall. Each of the pins defines an axis with a respective clip.

BRIEF DESCRIPTION OF THE FIGURES

FIG. 1 is a perspective view of a prior art clamshell-style cable hanger mounted on a C-clamp.

FIGS. 2A and 2B are side and section views of the C-clamp of FIG. 1.

FIG. 16 is a partial schematic view of cables hangers of FIGS. 13A and 13B stacked in an orientation that enables the grasping of intermediate sized cables.

FIGS. 17A and 17B are top and side views of a cable hanger according to additional embodiments of the invention.

DETAILED DESCRIPTION OF THE INVENTION

Figure 3A:
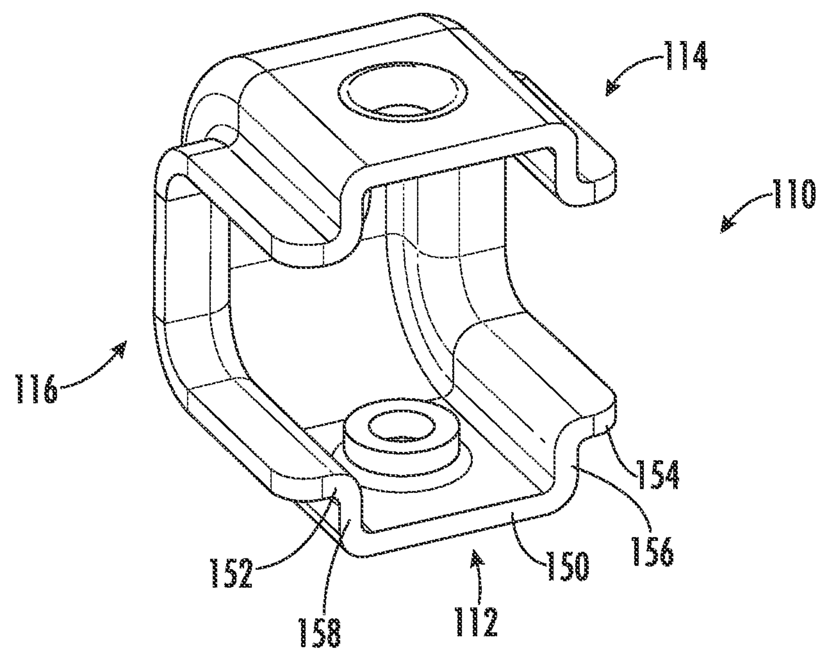
FIGS. 3A and 3B are perspective views of a C-clamp according to embodiments of the invention.

The present invention now is described more fully hereinafter with reference to the accompanying drawings, in which embodiments of the invention are shown. This invention may, however, be embodied in many different forms and should not be construed as limited to the. embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terns (including technical and scientific terms) used herein have the same meaning as commonly understood by one of ordinary skill in the art to Which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not he described in detail for brevity and/or clarity.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the teats "comprises" and/or "comprising", When used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the drawings, an assembly of a C-clamp 10 and a stack of two cable hangers 30 is shown in FIG. 1. As can be seen therein, the C-clamp 10 has two arms 12, 14 that extend generally perpendicularly from a base 16. The arms 12, 14 and the base 16 define generally a clamping space S. Each of the arms 12, 14 has a respective hole 13, 15, and the base 16 also includes a hole 17. A clamping bolt 20 is threaded into and through the hole 15. A clamping pad 21 is present at one end of the clamping bolt 20 within the clamping space S. The bolt 20 is inserted through a nut 22 and a lock washer 24 outside the clamping space S.

Each of the cable hangers 30 is a clamshell-type cable hanger, with two hanger members 31, 32 that are connected to form a single cable hanger. The hanger members 31, 32. include features on their ends (e.g., grooves and mating tabs) that secure the hanger members 31, 32 in a mated configuration. Each of the cable hanger members 31, 32 has a cavity 34, 35, which together can grasp a cable (not shown). Each of the hanger members 31, 32 also includes a central hole (not shown) that receives a threaded rod 36. The threaded rod 36 is inserted into either the hole 13 or the hole 17 on the base 16 of the C-clamp 10 and is inserted through the holes in the hanger members 31, 32 to permit the stacking of multiple cable hangers 30. A nut 38 is threaded onto the end of the threaded rod 36 and tightened to maintain the cable hangers 30 in place.

The C-clamp 10 and cable hangers 30 can be mounted on a mounting surface or substrate by positioning the C-clamp 10 so that the mounting structure is between the clamping pad 21 and the arm 14, then tightening the clamping bolt 20 so that the mounting structure is captured between the clamping pad 21 and the arm 12. The hanger members 31, 32 of one of the cable hangers 30 can be brought together to capture cables in the cavities 34, 35, then inserted onto the threaded rod 36. Additional cable hangers 30 can then be employed to capture additional cables, then inserted mounted onto the threaded rod 36 to form a stack of cable hangers 30.

Referring now to FIGS. 2A and 2B, the C-clamp 10 is shown therein. The C-clamp 10 is typically forming by bending a strip of metal (e.g., coated or stainless steel) and, as can be seen in FIG. 2B, the C-clamp 10 typically has an elongate rectangular cross-section.

Figure 3B:
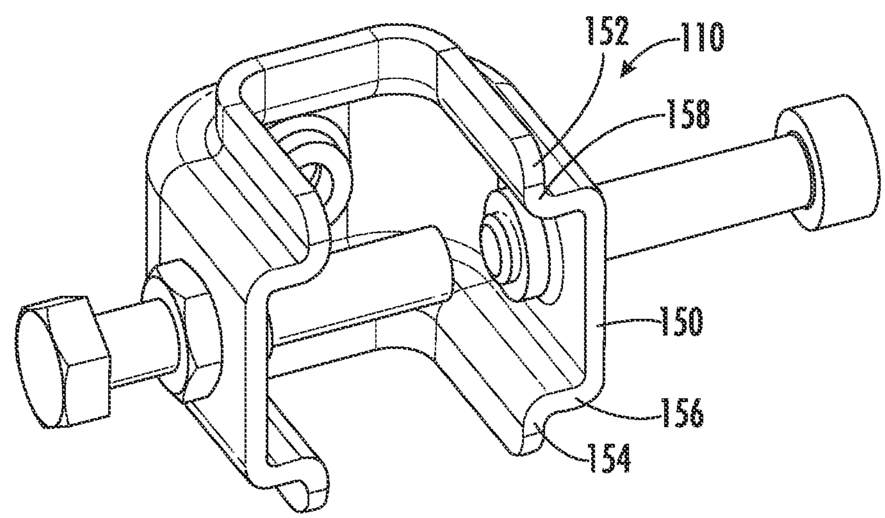

Referring now to FIGS. 3A and 3B, a C-clamp 110 according to embodiments of the invention is shown therein. The C-clamp 110 has arms 112, 114 and a base 116 like the C-clamp 10, but has a cross-section with a central segment 150 and two lateral segments 152, 154 that are generally parallel with each other and with the central segment 150 but are offset in the thickness direction from the central segment 150, and further has two transition segments 156, 158 that connect the central segment 150 to the lateral segments 152, 154 and that are generally perpendicular to the central and lateral segments 150, 152, 154.

A potential advantage of this arrangement can be understood from the following discussion. The deflection of a beam of constant cross-section is proportional to the moment of inertia (I) of the cross-section. For a rectangular cross-section, such as that of the C-clamp 10:

$$I=wh^3/12$$

wherein w=width and h=height of the rectangle. For the cross-section of the C-clamp 110, the moment of inertia (I) can be calculated as follows:

$$I_T=I_1-I_2-2I_3$$

wherein $I_1$ is the moment of inertia of the rectangle 1 defined by the overall cross-section, $I_2$ is the moment of inertia of the rectangle defined by the central segment 150 and the transition segments 156, 158, and $I_3$ is the moment of inertia of the rectangles defined by the transition segments 156, 158 and their respective attached lateral segments 152, 154. (This assumes that the moment of inertia transfer function is much less than the overall moment of inertia and therefore can be disregarded).

For the C-clamp 10, if a bar having a cross-section of 25.4 mm×5.8 mm is used, I=413 $mm^4$. For the C-clamp 110, if the cross-section has an overall width of 25.4 mm (with the central section 150 being 18 mm in width), the overall height being 6.5 mm, and the thickness of each section being 3.0 mm, $I_T$ for the cross-section equals 512 $mm^4$, which indicates a stiffer component. However, this can be accomplished with a thinner component (the cross-sectional area of the C-clamp 110 is approximately half that of the C-clamp 10), Which indicates a lighter, and likely less expensive, component with equal or increased stiffness.

Figure 4A:
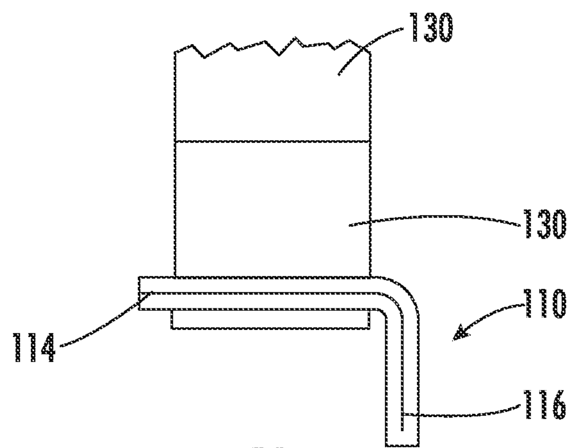
FIGS. 4A and 4B are side and section view of the C-clamp of FIGS. 3A and 3B with hangers mounted thereon.
Figure 4B:
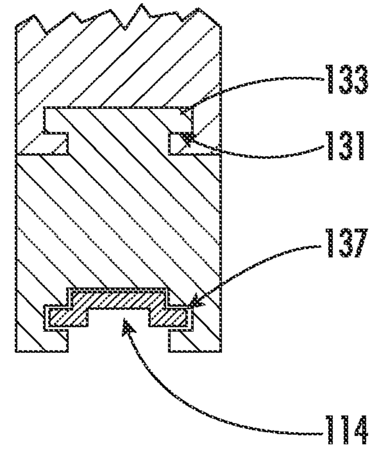

FIGS. 4A and 4B illustrate how the shape of the C-clamp 110 may be used to secure cable hangers thereon. As shown in FIG. 4B, each cable hanger 130 includes a recess 131 in its lower surface that generally matches the cross-sectional shape of the C-clamp 110. As such, the cable hanger 130 can be slid into place on the C-clamp 110. Each cable hanger 130 also includes a protrusion 133 that is similar in cross-section to the recess 131. Thus, a first cable hanger 130 can be slid into place on the C-clamp 130, with an arm or the base of the C-clamp 110 received in the recess 131, and a second cable hanger 130 can be attached to the first cable hanger 130 by sliding the protrusion 133 of the first cable hanger 130 into the recess 131 of the second cable hanger 130. Further cable hangers 130 can be stacked in a like manner.

Figure 5A:
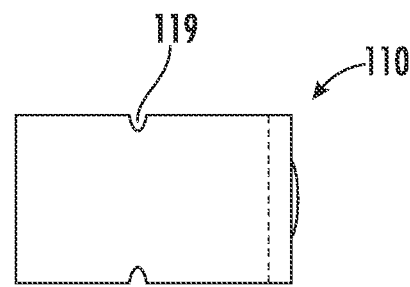
FIGS. 5A and 5B are bottom views of the C-clamp of FIGS. 3A and 3B and one of the hangers of FIGS. 4A and 4B.
Figure 5B:
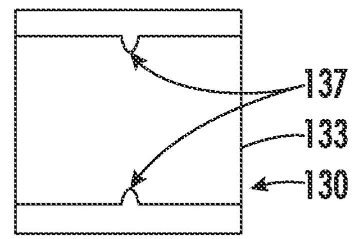

As shown in FIGS. 5A and 5B, in some embodiments the C-clamp 110 may include a recess 119 on the edge of each lateral segment 112, 114 that can be received in corresponding nubs 137 in the recess 131 of the cable hanger 130 to further secure the attachment of the cable hanger 130 to the C-clamp 110. Similarly, the protrusion 133 may have recesses that may receive nubs 137 in the recess 133 of a cable hanger 130 stacked thereon.

Figure 6:
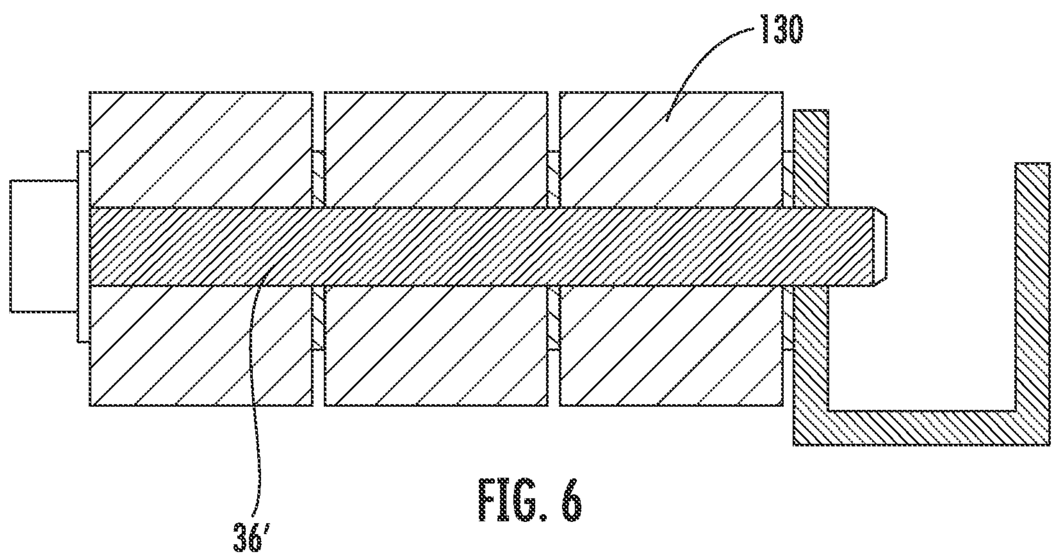
FIG. 6 is a section view of an alternative embodiment of cable hangers according to embodiments of the invention.

FIG. 6 illustrates a stack of cable hangers 130 mounted in a stacked configuration to a C-clamp using a bolt 36' instead of a threaded rod.

Referring now to FIGS. 7A-7D and FIG. 8, another embodiment of a cable hanger, designated broadly at 230, is shown therein. The cable hanger 230 includes first and second hanger members 240, 260 attached at their edges by a living hinge 231. As used herein, the word "hanger member" is intended to refer to two portions of a cable hanger that are brought together and secured to form the cable hanger. "Hanger members" may be identical, minor images, of similar construction, and/or of similar size, but need not be. The hanger members 240, 260 are discussed below.

The hanger member 240 includes two side walls 241*a*, 241*b* and two end walls 242*a*, 242*b* that generally form an open box. An internal wall 243 spans the side walls 241*a*, 241*b* near but spaced from the end wall 242*b*. Slightly curved walls 244 define a mounting hole 245 between the walls 242*b*, 243. Each of the side walls 241*a*, 241*b* has a large arcuate cutout area 246 between the end wall 242*a* and the internal wall 243, and also includes a centering projection 247 between the internal wall 243 and the end gall 242*b*.

A large cable gripping member 248 extends in a cantilevered fashion at an oblique angle from the side wall 241*b* toward the side wall 241*a*. The large gripping member 248 is skeletal in construction, with two arms 249 flanking a supporting rib 250. The arms 249 and rib 250 originate from positions near the perimeter of the cutout area 246 of the side wall 241*b* and terminate in a location above the perimeter of the cutout area 246 of the side wall 241*a*. A V-shaped member 251 spans the ends of the arms 249 and rib 250. The oblique angle defined by the large cable gripping member 248 relative to the side wall 241*b* is typically between about 30 and 30 degrees.

An extension 251 extends from the end wall 242*b*, with two walls 252*a*, 252*b* and a cross-member 253. Small cutout areas 254 are present in the walls 252*a*, 252*b*. A small cable gripping member 255 extends at an oblique angle from the wall 252*b*; the small cable gripping member 256 has two arms 254 and a V-shaped member 257 spanning the ends of the arms 254. The cross-member 253 includes a latch 258 with a hook 259 on its outer surface.

The hanger member 260 is the mirror image of the hanger member 240, with the exception that it includes centering cutout areas 267 on its side walls 261*a*, 261*b* between the. internal wall 263 and the end wall 262*b* rather that cutout areas, and further includes a detent 278 on the cross-member 273 of the extension 271.

Figure 7A:
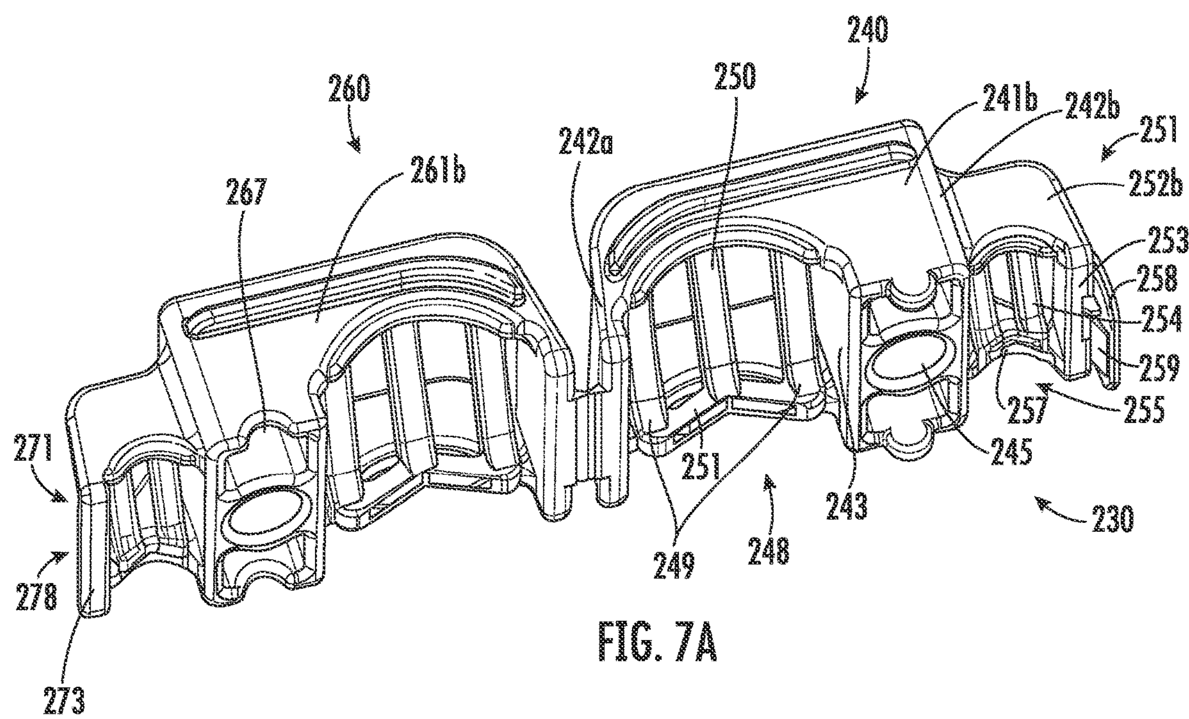
FIGS. 7A-7C are front, rear and bottom perspective views of a cable hanger according to embodiments of the invention, wherein the cable hanger is shown in an unfolded position.
Figure 7B:
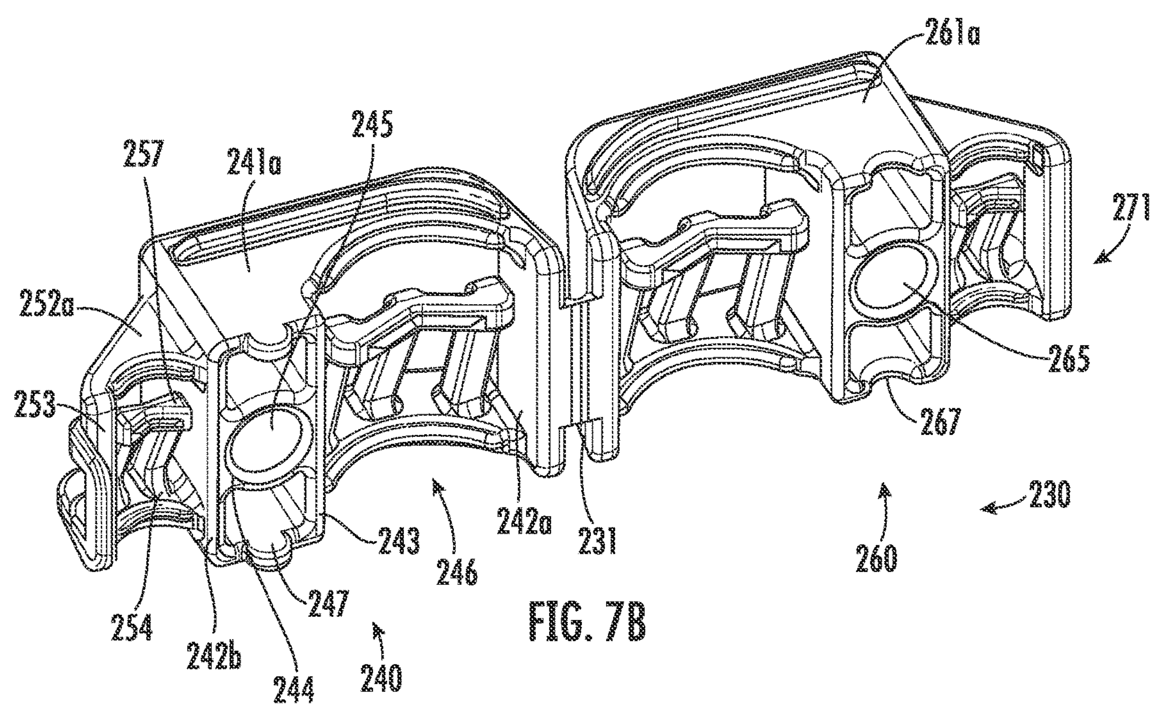
Figure 7C:
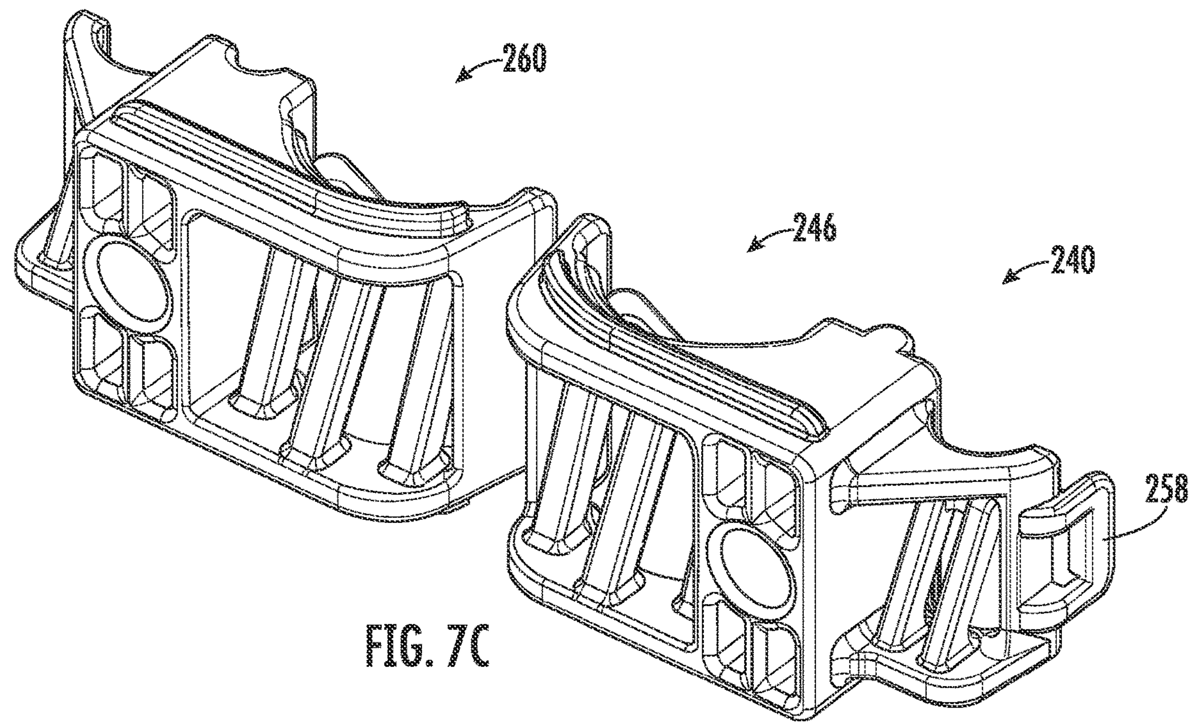

As shown in FIGS. 7A and 7B, in an open position the hanger members 240, 260 of the cable hanger 230 are side-by-side, connected by the living hinge 231. The cable hanger 230 can be used to hang cables by rotating the hanger member 260 180 degrees relative to the hanger member 240 about the living hinge 231. Such rotation causes the hook 279 of the latch 278 to engage the detent 258 and secure hanger members 240, 260 together in a closed position (see FIG. 7D). Also, the centering projections 247 are received in the centering cutout areas 267 to assist with alignment and to provide stability.

Figure 7D:
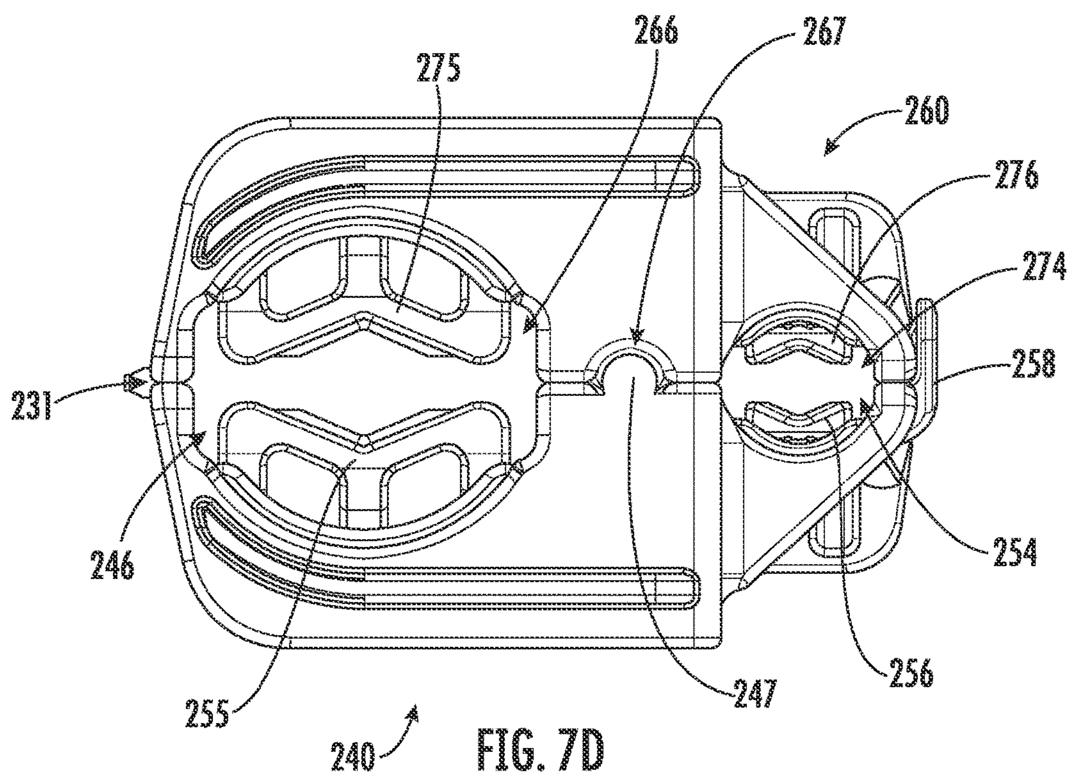
FIG. 7D is a side view of the cable hanger of FIGS. 7A-7C, shown in a closed position.

It can be seen in FIG. 7D that the large cutout areas 246, 266 form a cavity in which a large cable may be grasped. The large cable gripping members 255, 275 can apply clamping pressure to the cable through their V-shaped members 257, 277, which can cradle the cable. The cantilevered configuration of the gripping members 255, 275 can allow the gripping members 255, 275 to flex, such that they are able to grasp cables of varying sizes. Similarly, the small cutout areas 254, 274 form a cavity in which a small cable may be grasped. The small cable gripping members 256, 276 are flexible and can also grasp cables of varying sizes.

Figure 8:
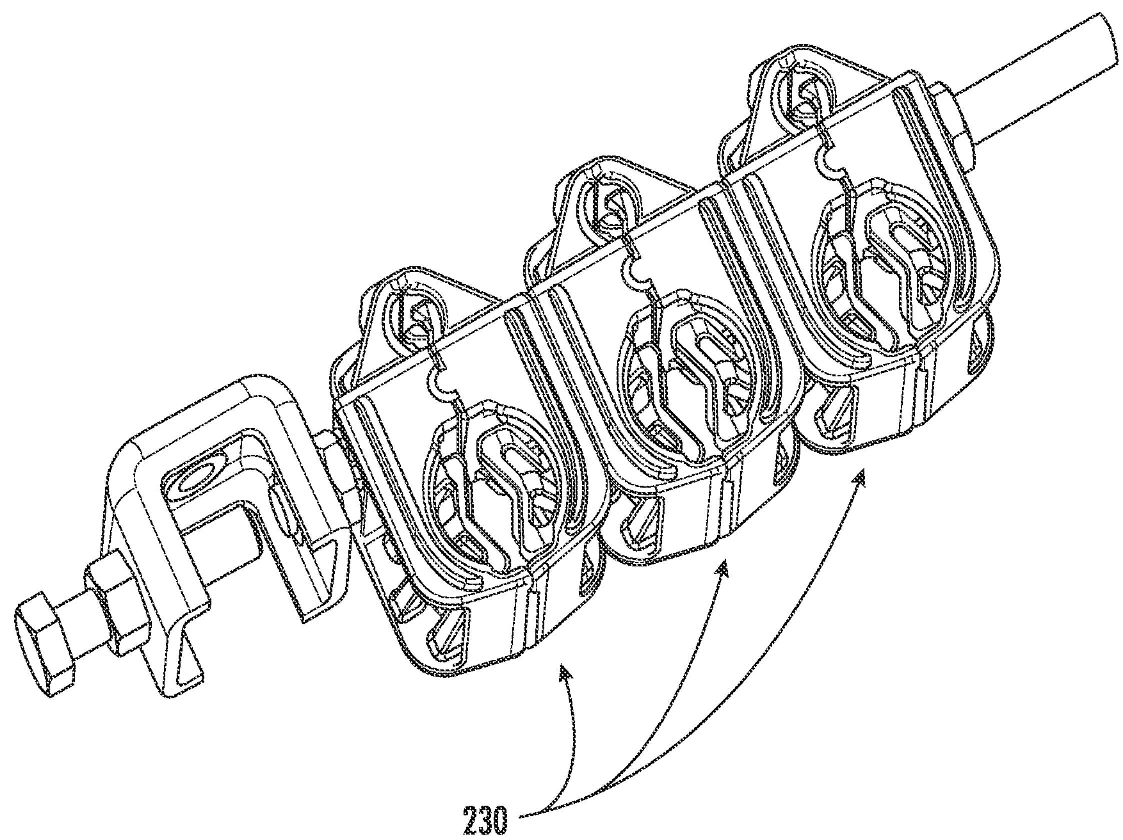
FIG. 8 is a perspective view of three cable hangers of FIGS. 7A and 7B in a closed position and mounted on a rod in a stacked configuration.
Figure 9A:
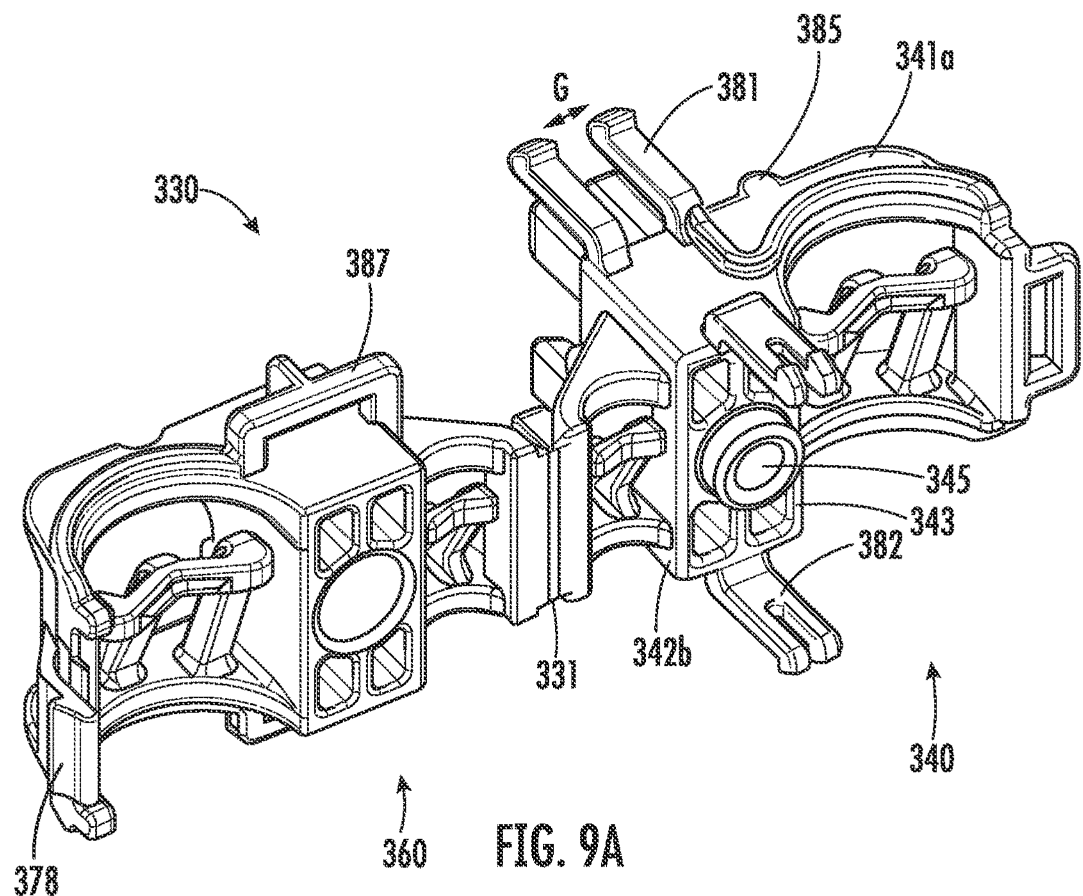
FIGS. 9A and 9B are front and rear perspective view of a cable hanger according to additional embodiments of the invention, shown in an unfolded position.
Figure 9B:
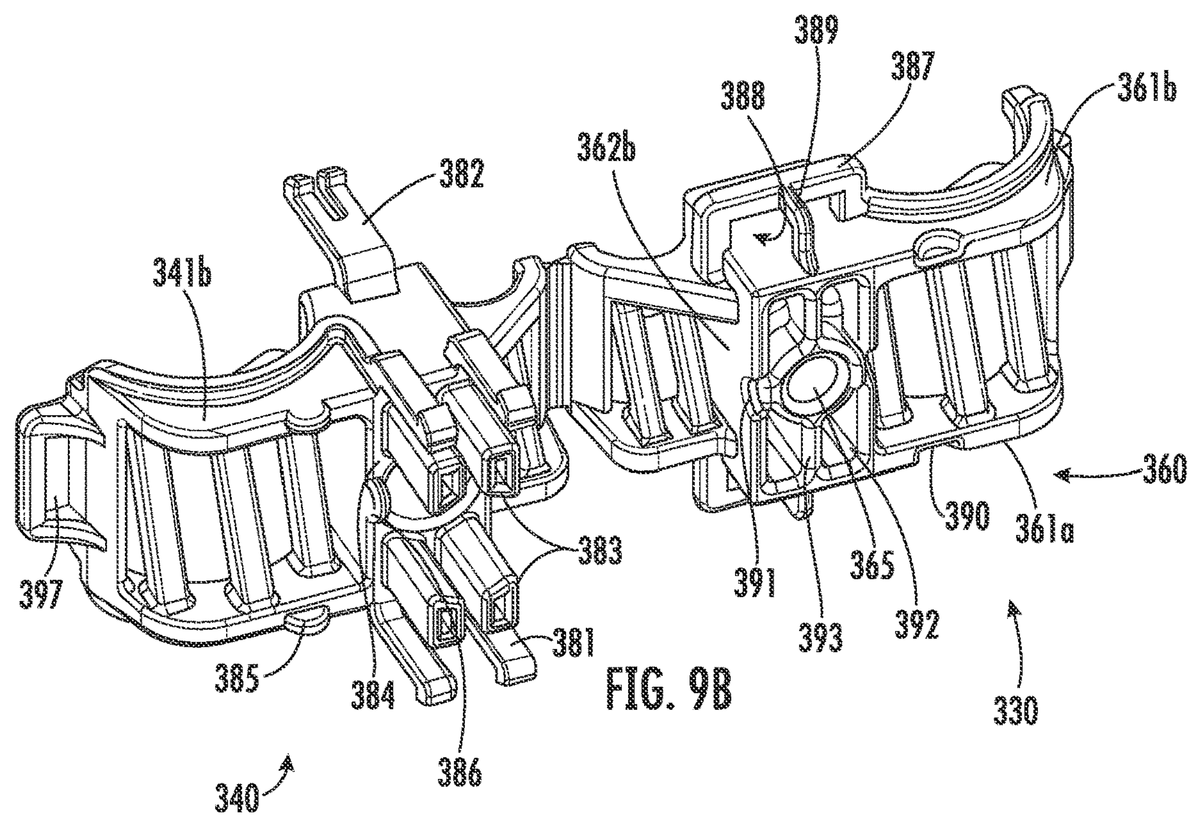
Figure 9C:
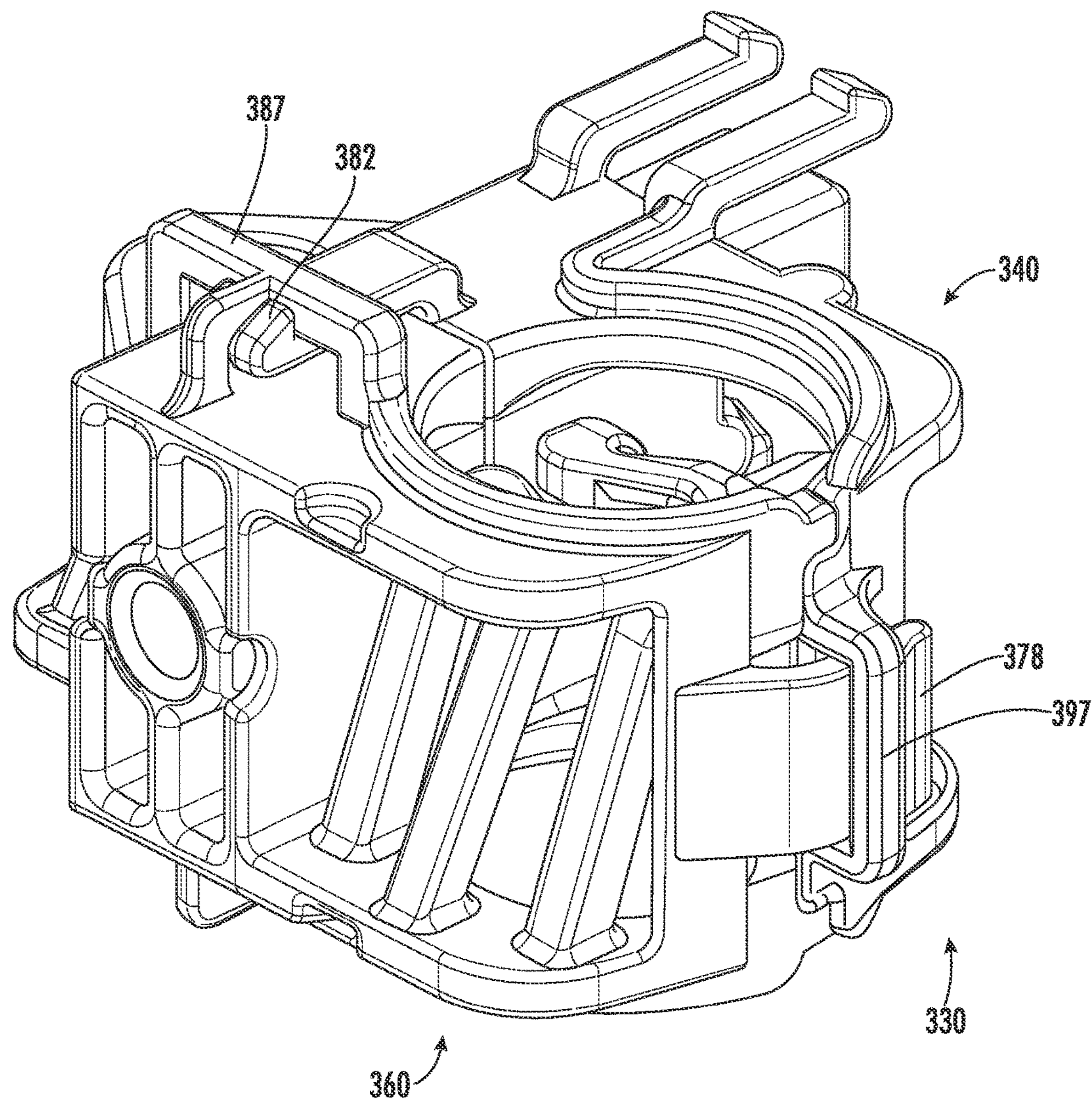
FIG. 9C is a bottom perspective view of the cable hanger of FIGS. 9A and 9B, Shown in a closed position.

Referring now to FIG. 8, the cable hanger 230 can be mounted on a mounting structure via a bolt, threaded rod, or the like inserted through the mounting holes 245, 265 (which align When the hanger members 240, 260 are folded into the closed position). Multiple cable hangers 230 may be arranged in a stacked configuration by inserting the threaded rod through the mounting holes 245, 265 of additional cable hangers 230.

Referring now to FIGS. 9A-9C and 10A-10B, another embodiment of a cable hanger is illustrated therein and designated at 330. The cable hanger 330 is similar to the cable hanger 230 with the exception that the cable hanger 330 is configured so that multiple cable hangers 330 may be stacked upon each other without the need for a threaded rod or the like. The differences between the cable hanger 330 and the afore-described cable hanger 230 are discussed below.

One hanger member 340 of the cable hanger 330 has two sets of latches. A first pair of latches 381 extends from the lower edge of each side wall 341*a*, 341*b* and has a gap G between them. A second pair of latches 382 extends from the upper edge of each side wall 341*a*, 341*b*. Four braces 383 extend downwardly from a floor 384 that spans the side walls 341*a*, 341*b* between the end wall 342*b* and the internal wall 343. The braces 383 are positioned inwardly of the latches 381 and outwardly from the mounting hole 345. Also, the hanger member 340 has a small nub 385 on the lower edges of the side walls 341*a*, 341*b*, and a nub 386 on the lower edge of the end wall 342*b*. Further, rather than a detect, the hanger member 340 has a latch receptacle 397 on the end wall 342*a*.

The other hanger member 360 of the cable hanger 330 has a rectangular latch receptacle 387 that extends laterally from each side wall 361*a*, 361*b*. The receptacle 387 includes an opening 388 and a divider 389. A recess 390 is present in the upper edge of each side wall 361*a*, 361*b*, and another recess 391 is present in the upper edge of the end wall 362*b*. A latch 378 extends downwardly from the end wall 362*a*. Four compartments 392 are formed around the mounting hole 365 by a divider 393.

A further difference between the cable hanger 230 and the cable hanger 330 is the location of the living hinge 331. which is positioned on the extensions 351, 371.

Figure 10A:
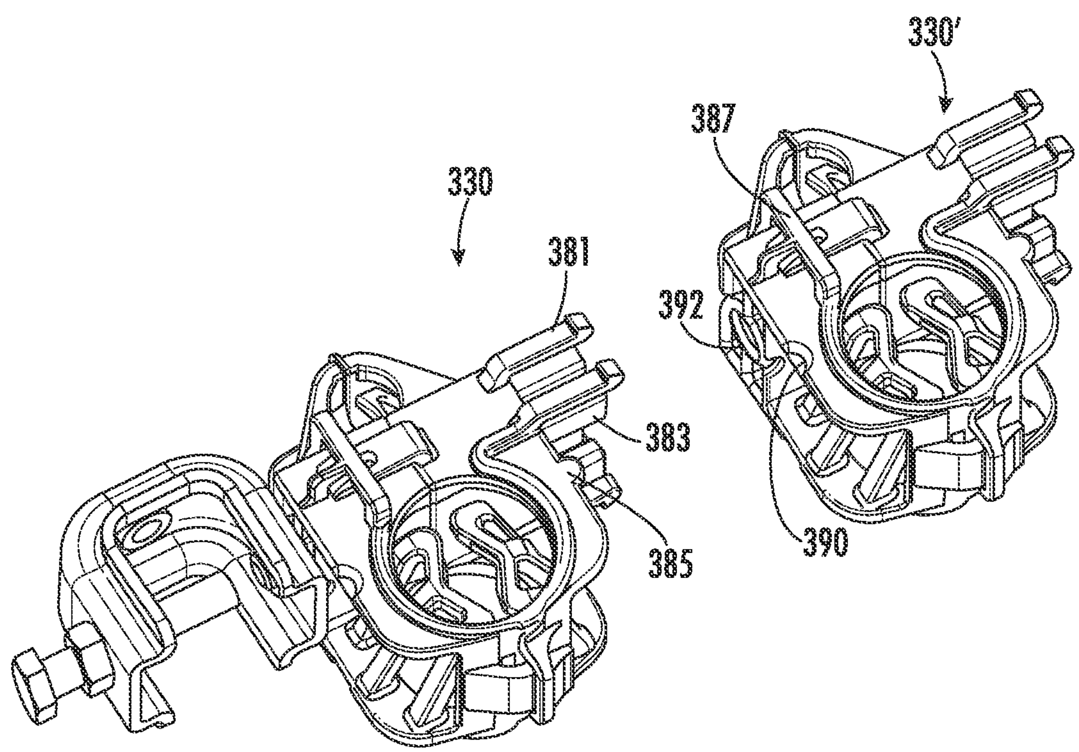
FIG. 10A is a perspective view of two cable hangers of FIG. 9A in the closed position prior to stacking.
Figure 10B:
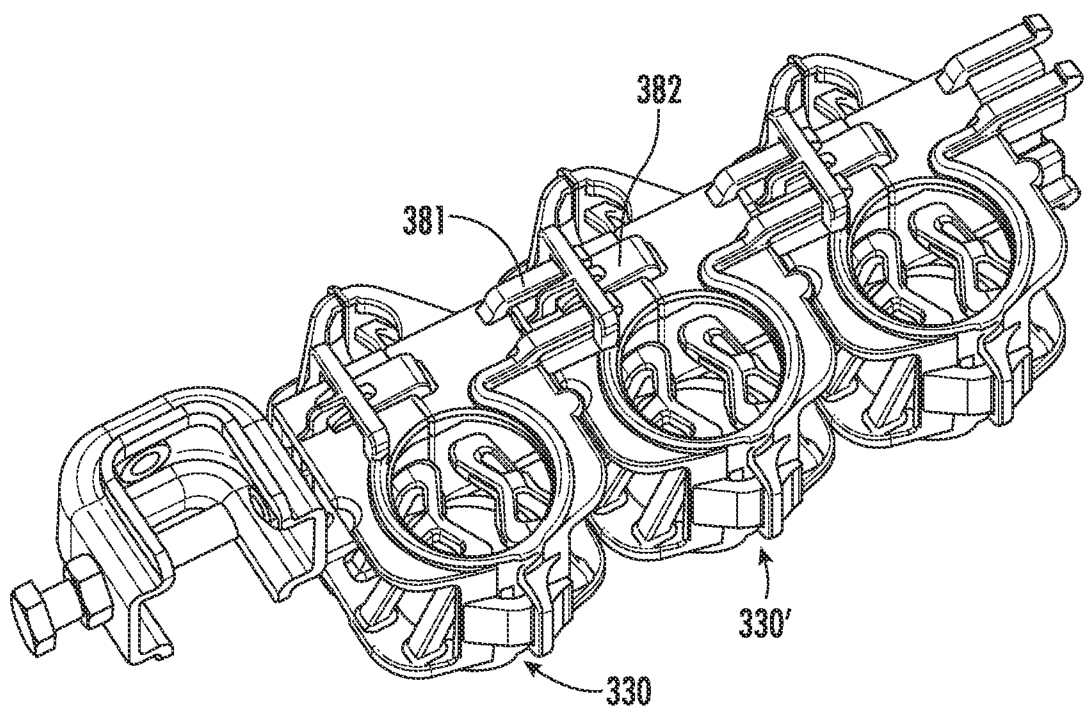
FIG. 10B is a perspective view of three cable hangers of FIGS. 9A-9C, shown in the closed position and mounted on a rod in a stacked configuration.
Figure 11A:
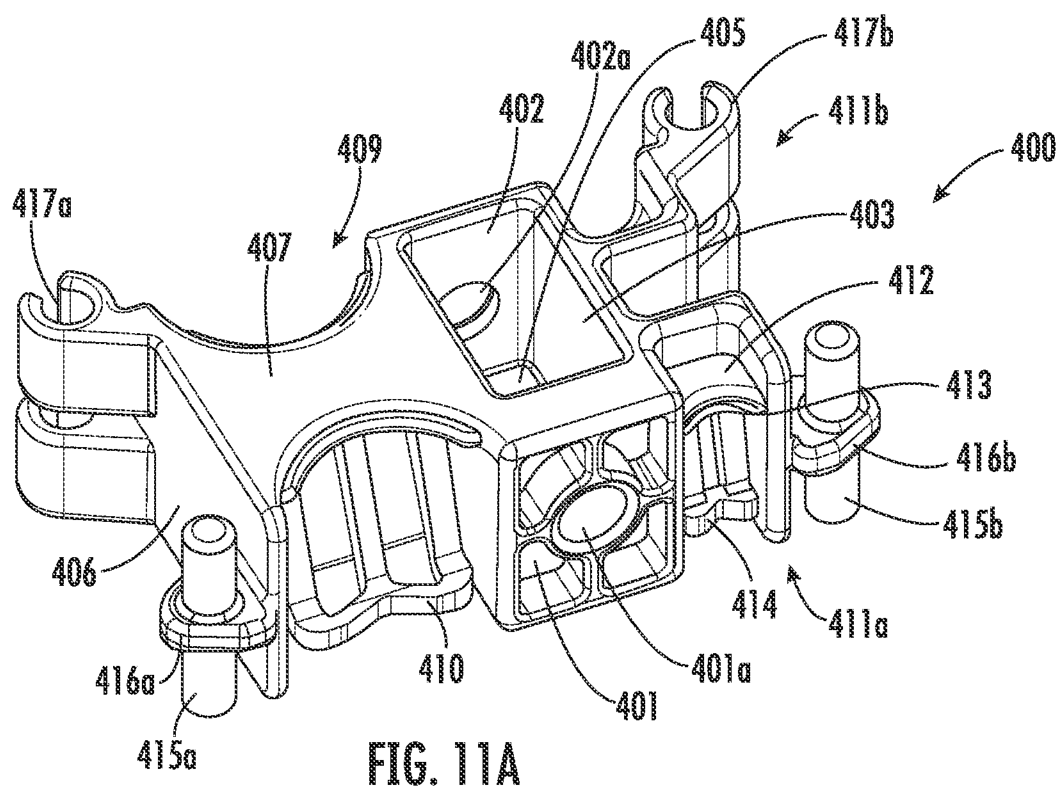
FIGS. 11A and 11B are front and rear perspective views a cable hanger member according to additional embodiments of the invention.
Figure 11B:
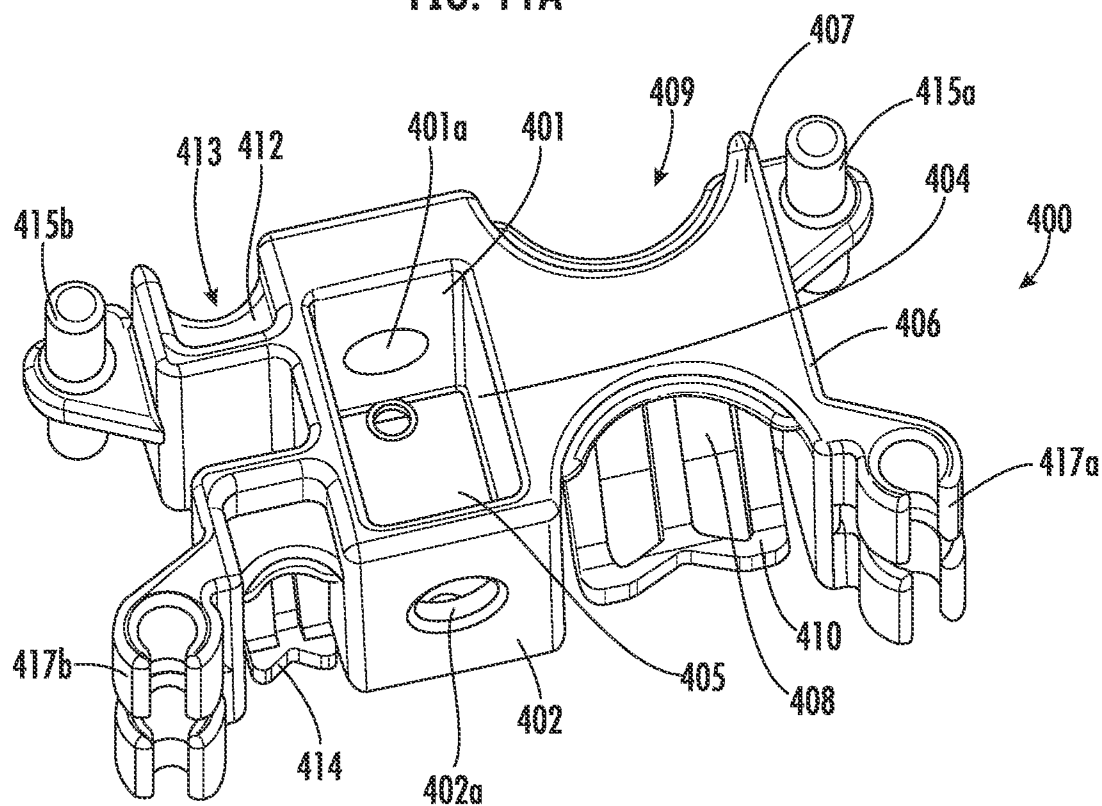

The cable hanger 330 is moved from the open position to the closed position (FIG. 9C) by rotating the hanger member 360 180 degrees about the living hinge 331, inserting the latch 378 into the receptacle 397, and inserting the latches 382 into the latch receptacle 387. Such rotation can clamp cables within the cable cavities in the manner discussed above. However, as shown in FIGS. 10A and 10B, a second cable hanger 330' can be attached to a first cable hanger 330 by sliding the latches 381 of the first cable hanger 330 into the latch receptacle 387 of the second cable hanger 330'. As can be seen in FIG. 10B, the latches 381 of the first cable hanger 330 sandwich the latches 382 of the second cable hanger 330'. In addition, the braces 383 of the first cable hanger 330 fit within the compartments 392 of the second cable hanger 330'. The nubs 385, 386 of the second cable hanger 330' also fit within the recesses 390, 391 to enhance alignment and stability. Thus, once the first cable hanger 330 is mounted to a mounting surface (e.g., with a threaded rod in the mounting hole 345 as discussed above), subsequent cable hangers 330' can easily be added as a stack simply by latching them in place.

Referring now to FIGS. 11A, 11B, 12A and 12B, another cable hanger member, designated broadly at 400, is illustrated therein. The cable hanger member 400 incorporates some of the concepts of the cable hanger members 230, 330, but utilizes different configurations to provide additional flexibility and function.

The cable hanger member 400 includes a floor 401 with a mounting hole 401*a*, a ceiling 402 with a mounting hole 402*a*, an end wall 403 and an internal wall 404 that span the floor 401 and the ceiling 402, a side wall 405 that extends between the floor 401, ceiling 402, end wall 403 and internal wall 404, an end wall 406, a side wall 407 that extends between the internal wall 404 and the end wall 406, and a divider 408 that also spans the internal wall 404 and the end wall 406, but is normal to the side wall 407.

Large cable recesses 409 are present in the upper and lower edges of the side wall 407. Large cable gripping members 410 that are shaped much like the cable gripping members described above extend at an oblique angle from the side wall 407 near the periphery of the large cable recesses 409.

Two L-shaped extensions 411*a*, 411*b* extend from the end wall 403. Each of the extensions 411*a*, 411*b* has a short wall 412 with a small cable recess 413. A small cable gripping member 414 extends at an oblique angle from the wall 412 near the edge of each of the recesses 413.

A pin 416*a* is mounted on a base 416*a* that is in turn mounted to the lower end of the end wall 406. A corresponding pin 416*b* is mounted on a base 416*b* that is in turn mounted to the extension 411*a*. Two clips 417*a* are mounted to the upper end of the end wall 406, and a corresponding pair of clips 417*b* is mounted on the extension 411*b*.

Figure 12A:
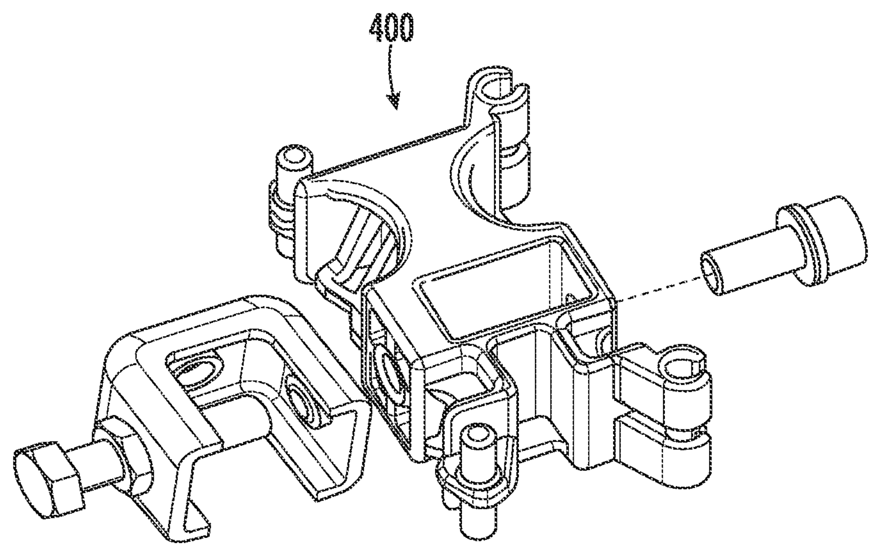
FIG. 12A is an exploded perspective view of the hanger member of FIGS. 11A and 11B prior to mounting on a C-clamp
Figure 12B:
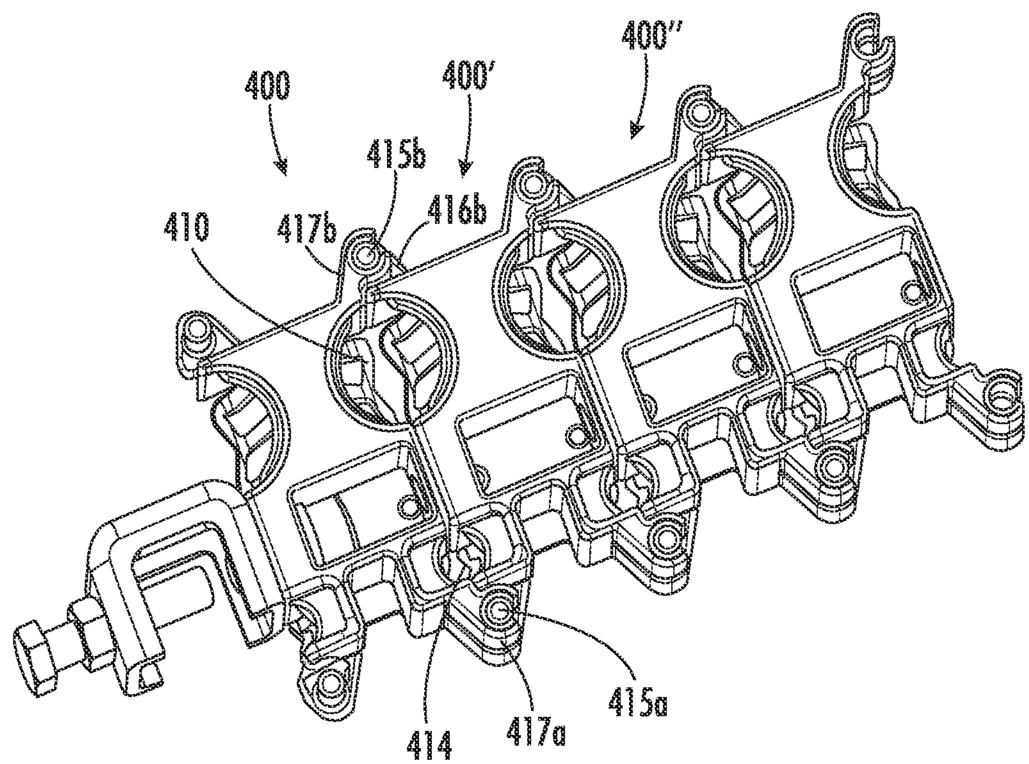
FIG. 12B is a perspective view of four hanger members of FIG. 11A and 11B, shown mounted on a rod in a stacked configuration.

A first cable hanger member 400 can be mounted to a C-clamp as shown in FIG. 12A. Then, as shown in FIG. 12B, two cable hanger members 400, 400' can be connected to grasp cable by inserting the pin 416*b* of the second cable hanger member 400' into the clips 417*b* of a first cable hanger member 400. The base 416*b* fits between the clips 417*b*. The second cable hanger member 400' can then be rotated about the axis defined by the pins 417*b* to grasp cables between the gripping members 410, 414. The cable hanger members 400, 400' and any cables captured therein can be fully secured by inserting the pins 416*a* of the cable hanger member 400' into the clips 417*a* of the cable hanger member 400. Another cable hanger member 400" can then be attached to the cable hanger member 400' in a similar manner to grasp two additional cables. Additional cable hanger members can continue to be attached in this stacked fashion to accommodate additional cables.

Another embodiment of a cable hanger member is illustrated in FIGS. 13A-15 and designated broadly at 500. The function of the cable hanger member 500 is rather similar to the cable hanger member 400 in that it relies on pins and clips to secure cables and to provide stacking capability. However, the structure of the cable hanger member 500 differs somewhat from that of the cable hanger member 400. The cable hanger member 500 includes two side walls 501*a*, 501*b* and two end walls 502*a*, 502*b* that generally form an open box. Two internal walls 503*a*, 503*b* span the side walls 501*a*, 501*b* near the center. Arcuate walls 504 define a boss that surrounds a mounting hole 505 between the internal walls 503*a*, 503*b*. On its upper edge, each of the side walls 501*a*, 501*b* has a large arcuate cutout area 506*b* between the end wall 502*a* and the internal wall 503*a*, and also includes a small arcuate cutout area 507*b* between the internal wall 503*b* and the end wall 502*b*. On its lower edge, each of the side walls 501*a*, 501*b* has a large arcuate cutout area 506*a* between the end wall 502*b* and the internal wall 503*b* (i.e., below the small cutout area 507*a*), and also includes a small arcuate cutout area 507*a* between the internal wall 503*a* and the end wall 502*a* (i.e., below the large cutout area 506*a*).

A large cable gripping member 508*a* (of construction similar to that described above) extends in a cantilevered fashion at an oblique angle from the side wall 501*a* near the cutout area 506*a* toward the side wall 501*b*. A second large cable gripping member 508*b* extends in a cantilevered fashion at an oblique angle from the side wall 501*b* near the cutout area 506*b* toward the side wall 501*a*. A small cable gripping member 509*a* (of construction similar to that described above) extends in a cantilevered fashion at an oblique angle from the side wall 501*b* near the cutout area 507*a* toward the side wall 501*a*. A second small cable gripping member 509*b* extends in a cantilevered fashion at an oblique angle from the side wall 501*a* near the cutout area 507*b* toward the side wall 501*b*. Thus, two of the pipping members (one for large cables, and one for small cables) originate from each side wall 501*a*, 501*b*.

Pairs of pins 516*a* are mounted on the upper end of the end wall 502*a*. A corresponding pair of pins 516*b* is mounted to the end wall 502*b*. Two clips 517*a* are mounted to the lower end of the end wall 502*a*, and a corresponding pair of clips 517*b* is mounted on the lower end of the end wall 502*b*.

Two cable hanger members 500, 500' can be secured to grasp cables in the manner discussed above in connection with the cable hanger members 400 (see FIGS, 14 and 15). The clips 517*b* of a second cable hanger member 500' are attached to the pins 516*a* of a first cable hanger member 500. Notably, for this to occur, the second cable hanger member 500' is oriented so that it is rotated 180 degrees about a vertical axis (i.e., an axis that passes through the mounting holes 505) relative to the first cable hanger member 500, One so oriented and attached, the second cable hanger member 500' can be rotated about the pins 516*a* into place to grasp cable with the gripping members and to attach the clips 517*a* of the first cable hanger 500 to the pins 516*b* of the second cable hanger 500'.

When a third cable hanger member 500" is to be attached, it is rotated to the same orientation as the first cable hanger member 500. Notably, in this arrangement, the areas for grasping small versus large cables alternate as the stack grows, in contrast to the arrangement of the cable hanger members 400, 400', in which in the stacked arrangement the small cables being grasped are aligned with each other, as are the large cables being grasped. Thus, this arrangement may enable the grasping of more cables in a smaller space.

Another potential advantage of the cable hanger member 500 can be realized during deployment. If it is known that multiple cable hanger members 500 will be used (e.g., four hanger members 500 to be used to hang six cables), the four hanger members 500 can be attached together at one end only (for example, in an accordion- or fan-like arrangement) prior to deployment—see FIG. 14). The bottom cable hanger member 500 of the interconnected group can be mounted to a mounting surface, cables can be laid into place, and the unconnected ends of the remaining cable hanger members 500 can be quickly and easily snapped together. Thus. the time and difficulty of the act of deploying the hanger members and cables can be significantly reduced. The cable hanger member 400 may also provide this capability.)

Further, the cable hanger member 500 may provide the ability to gasp cables of an intermediate size. If, When connecting two cable hanger members 500, 500', the second cable hanger member 500' remains in the same orientation as the first cable hanger member 500, instead of one cavity for grasping cables having two large cable gripping members 508*a*, 508*b* and the other cavity having two small cable gripping members 509*a*, 509*b*, each of the cavities would include one of the large cable gripping members 508*a*, 508*b* and one of the small cable gripping members 509*a*, 509*b* (this is schematically shown in FIG. 16). Thus, the combined cable hanger members 500 may be suitable for grasping two cables of intermediate size. As such, the cable hanger member 500 may provide the technician mounting the cables with even more flexibility.

Figure 13A:
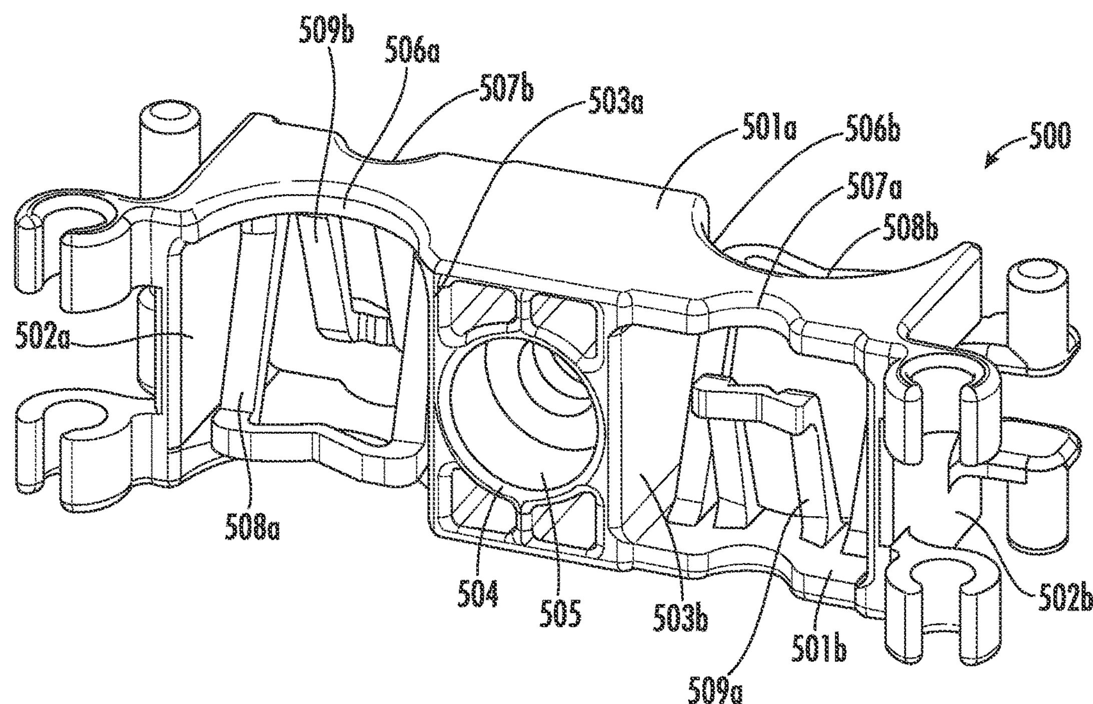
FIGS. 13A and 13B are front and rear perspective views of a cable hanger member according to further embodiments of the invention.
Figure 13B:
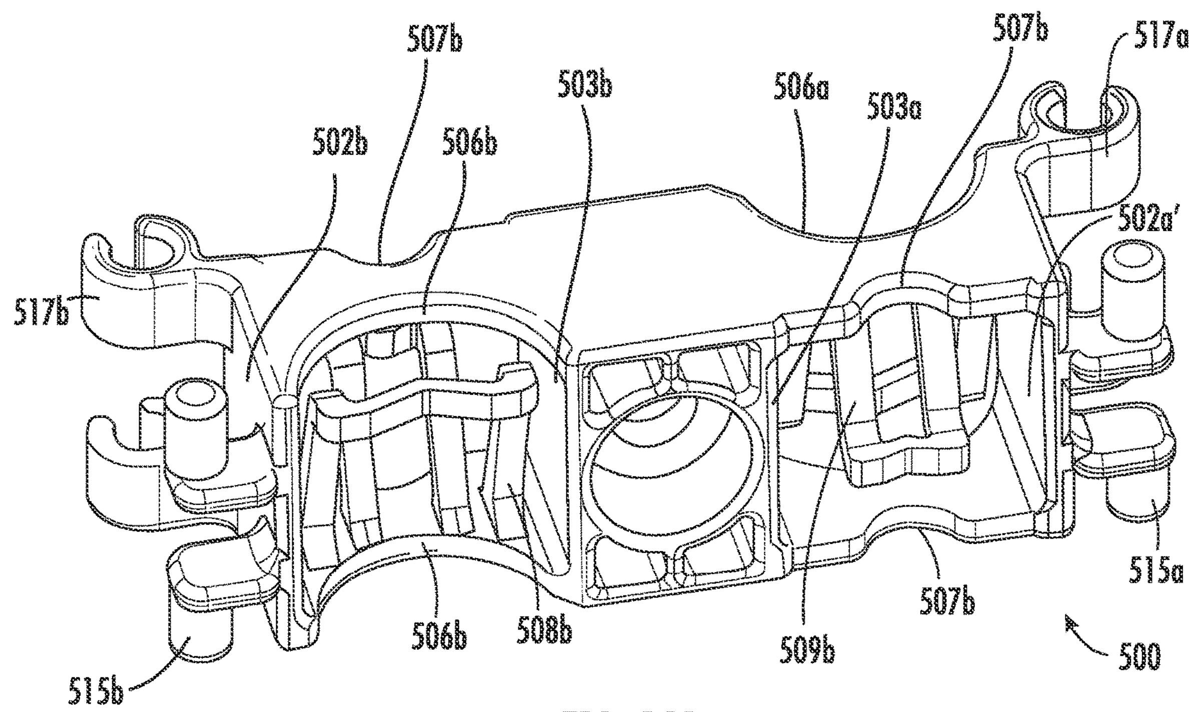
Figure 14:
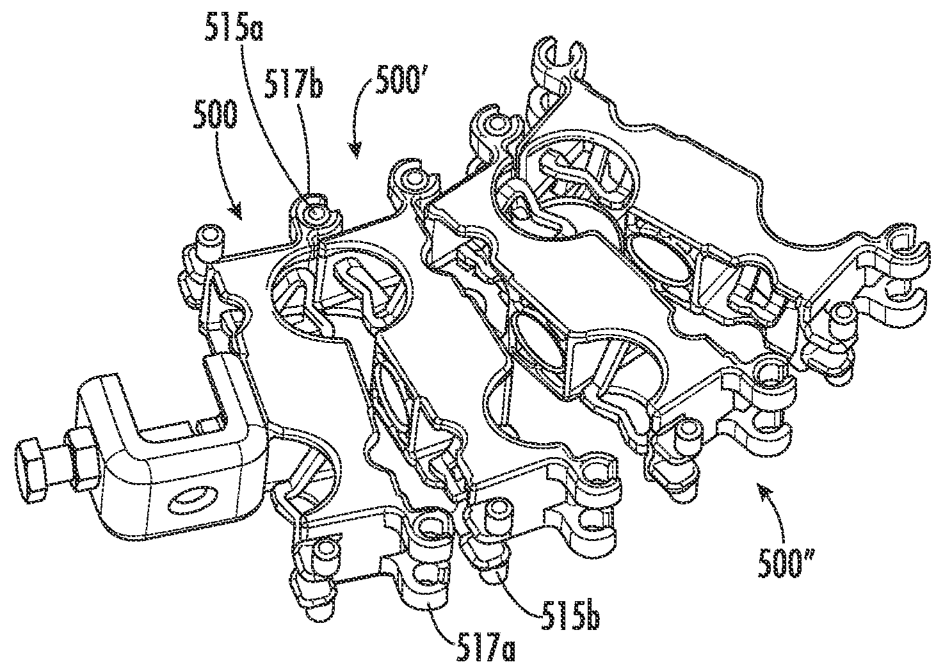
FIG. 14 is a front perspective view of four cable hangers of FIGS. 13A and 13B Shown connected at one end.
Figure 15:
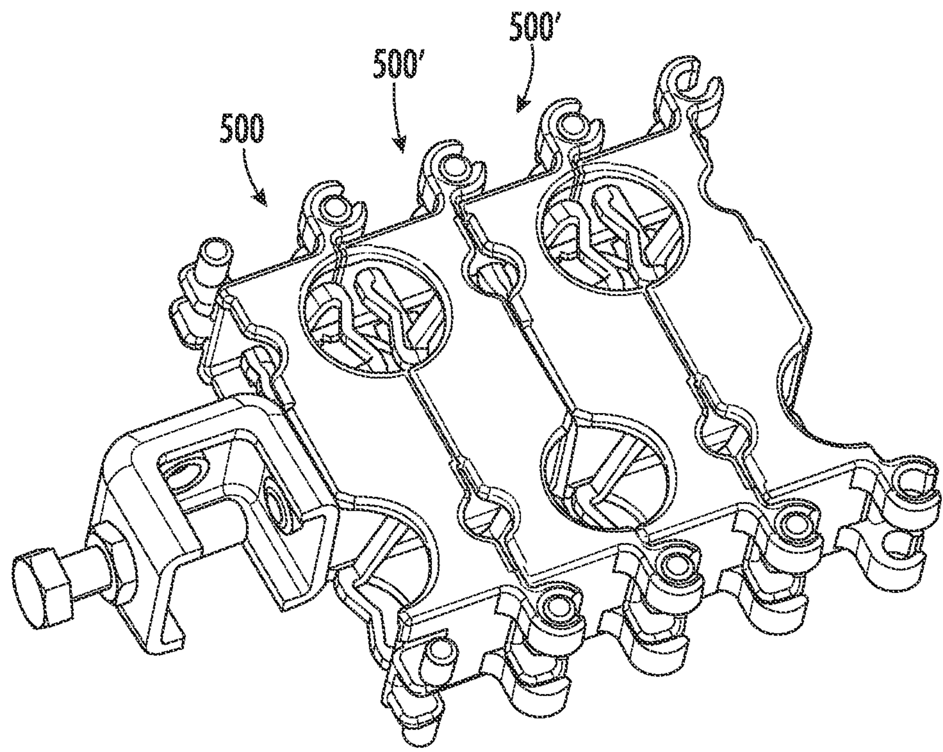
FIG. 15 is a perspective view of four cable hangers of FIGS. 13A and 13B, shown mounted on a rod in a stacked configuration.

Those of skill in this art will appreciate that the cable hanger members shown herein may take different forms. For example, the gripping members described and illustrated herein are skeletal cantilevered beams with V-shaped cross-members, in other embodiments one or more of the gripping members may take a different form. As one example, large and small gripping members 608*a,* 608*b,* 609*a,* 609*b* may be mounted on opposed side walls (see FIGS. 17A and 17B) rather than originating from the same side wall as shown in FIGS. 13A and 13B).

Figure 18A:
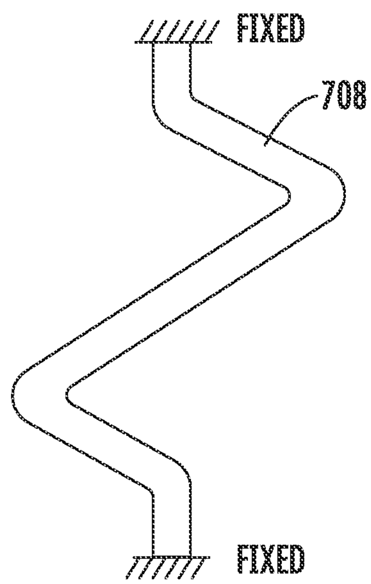
FIGS. 18A and 18B are partial top and side views of a gripping member for a cable hanger according to further embodiments of the invention.
Figure 18B:
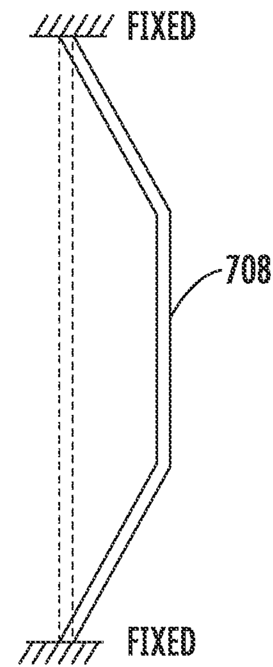

As another example, rather than the gripping members being cantilevered from one side wall of the cable hanger member, they may extend the width of the cable hanger member and be fixed at each end, and may have lateral structure to provide stability to a grasped cable. Examples of this configuration include: .gripping members 708 that follow a "sawtooth" path (see FIG. 18A), or a serpentine path. In either instance, the gripping member may rise/change elevation from its fixed ends to its center (see FIG. 18B).

Figure 19A:
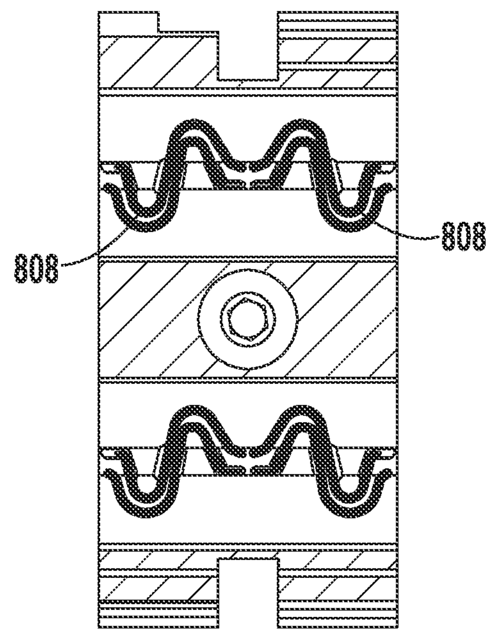
FIGS. 19A and 19B are top and end views of gripping members for a cable hanger according to further embodiments of the invention.
Figure 19B:
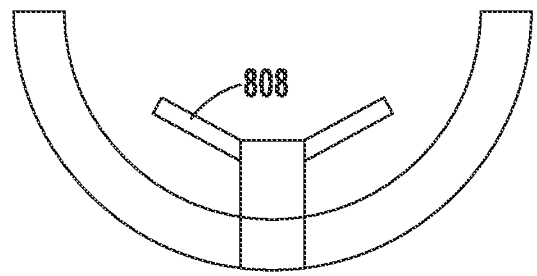
Figure 20:
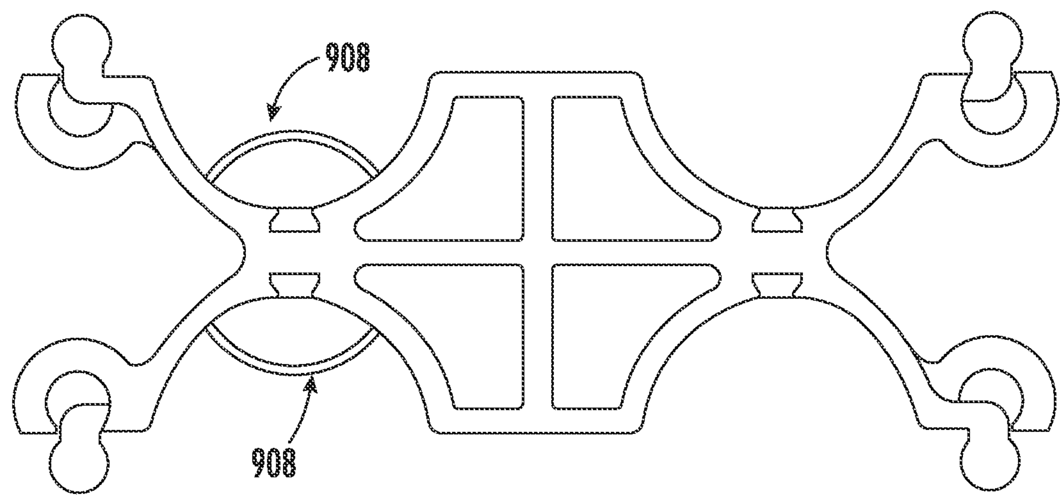
FIG. 20 is a front view of another cable hanger according to embodiments of the invention.

In some instances there may be two gripping members 808, with fixed ends at both the side wall and at the center of the cable hanger member (see FIGS. 19A and 19B), rather than a single gripping member that spans the width of the cable hanger member. Such gripping members 808 may be straight, sawtooth, serpentine (as shown in FIG. 19A), etc. as described above, and may or may not change in elevation (see an arcuate gripping member 908 in FIG. 20).

Figure 21:
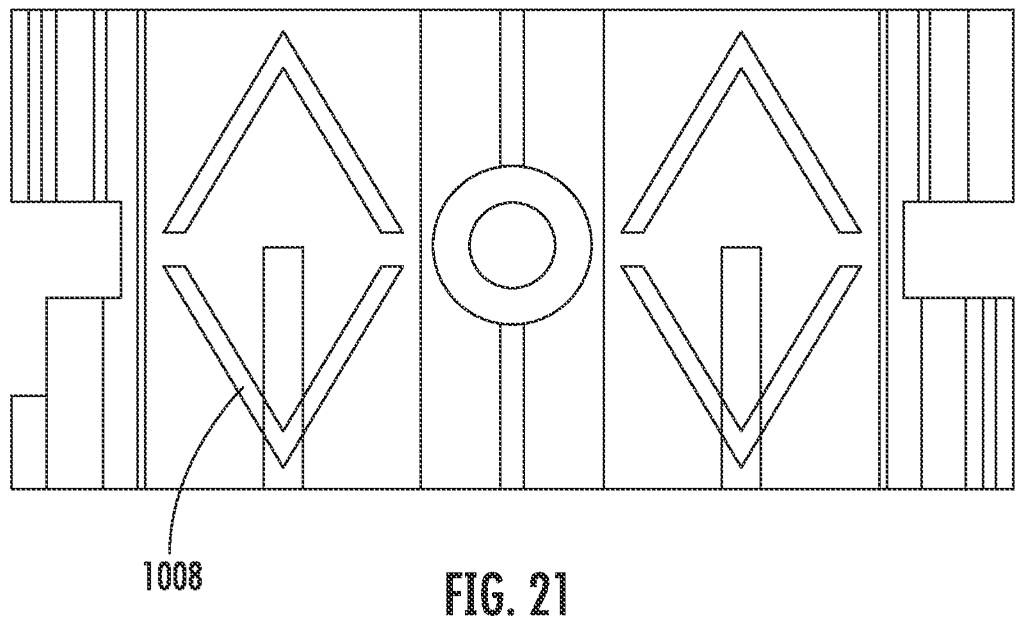
FIG. 21 is a top view of another cable hanger according to embodiments of the invention.

As another example, two or more cantilevered gripping members may be employed rather than a single cantilevered gripping member. FIG. 21 illustrates two "chevron" type gripping members 1008 with fixed ends within the cable cavity. As noted above, such gripping members may or may not change in elevation.

Figure 22:
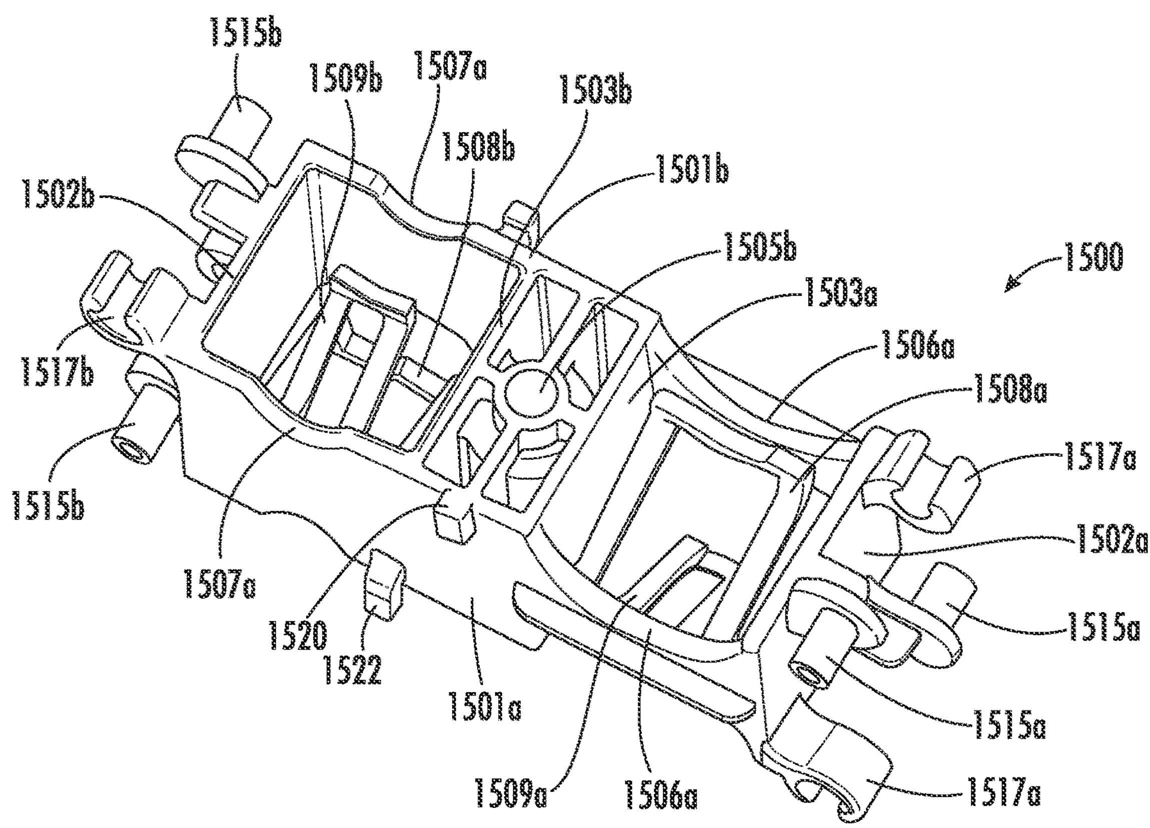
FIG. 22 is a top perspective vies of a further cable hanger member according to embodiments of the invention.
Figure 23:
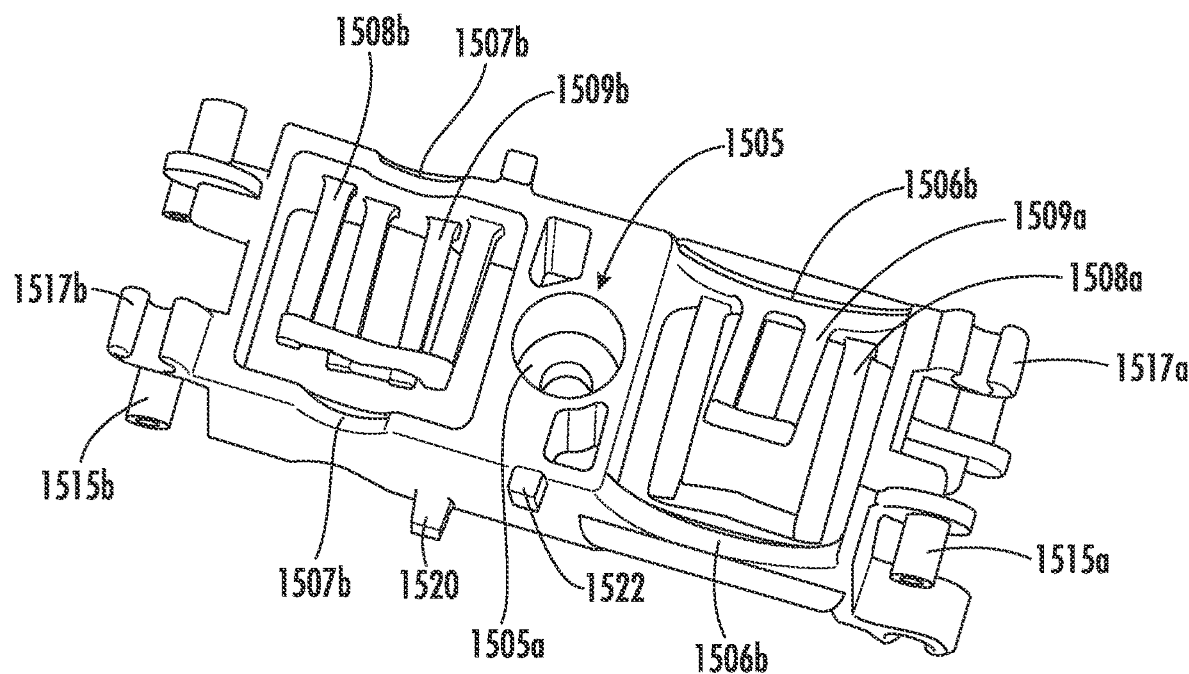
FIG-23 is a bottom perspective view of the hanger member of FIG. 22.

Referring now to FIGS. 22 and 23, another embodiment of a cable hanger, designated broadly at 1500, is shown therein. The cable hanger 1500 is similar to the cable hanger 500, but with some modifications and additions. Like the cable hanger 500, the cable hanger member 1500 includes two side walls 1501*a,* 1501*b* and two end walls 1502*a,* 1502*b* that generally form an open box. Two internal walls 1503*a,* 1503*b* span the side walls 1501*a,* 1501*b* near the center and surround a mounting hole 1505 with a larger portion 1505*a* and a smaller portion 1505*b*. However, each of the side walls 1501*a,* 1501*b* has two large cutout areas 1506*a,* 1506*b* between the end wall 1502*a* and the internal wall 1503*a,* and each of the side walls 1501*a,* 1501*b* also has two small cutout areas 1507*a,* 1507*b*. between the side wall 1502*b* and the internal wall 1503*b*. Two large gripping members 1508*a,* 1508*b* are mounted to and extend from the side wall 1501*a* (one on each side of the mounting hole 1505), and two smaller gripping members 1509*a,* 1509*b* are also mounted to and extend from the side wall 1501*a* (one on each side of the mounting hole 1505). Also, one large gripping member 1508*a* and one small gripping member 1509*a* are mounted in the "upper" half of the cable hanger 1500 (from the vantage point of FIG. 22), and the other large gripping member 1508*b* and the other small gripping member 1509*b* are mounted in the "lower" half of the cable hanger 1500.

As another difference between the cable hanger 1500 and the cable hanger 500, the end wall 1502*a* includes two pins 1515*a,* but one is on the "upper" half of the cable hanger 1500 and the other is on the "lower" half. The end wall 1502*a* also includes two clips 1517*a,* one on the upper half and one on the lower half of the cable hanger 1500. One of the clips 1517*a* is adjacent the side wall 1501*a,* and the other clip 1517*a* is adjacent the side wall 1517*b*. Thus, in each instance a pin and a clip define an axis (i.e., the pill has a longitudinal axis that passes through the receiving area of the clip). A similar arrangement of pins 1516*b* and clips 1517*b* is present on the side wall 1502*b,* although an alternating pattern is followed (e.g.,. a clip 1517*b* is on the upper half of the cable hanger 1500 adjacent the side wall 1501*a,* whereas the corresponding location of side wall 1502*a* has a pin 1515*a*).

Further, each side wall 1501*a,* 1501*b* includes tabs 1520, 1522 that protrude beyond. the side walls 1501*a,* 1501*b* and can assist in keeping stacked cable hangers 1500 aligned.

Figure 24:
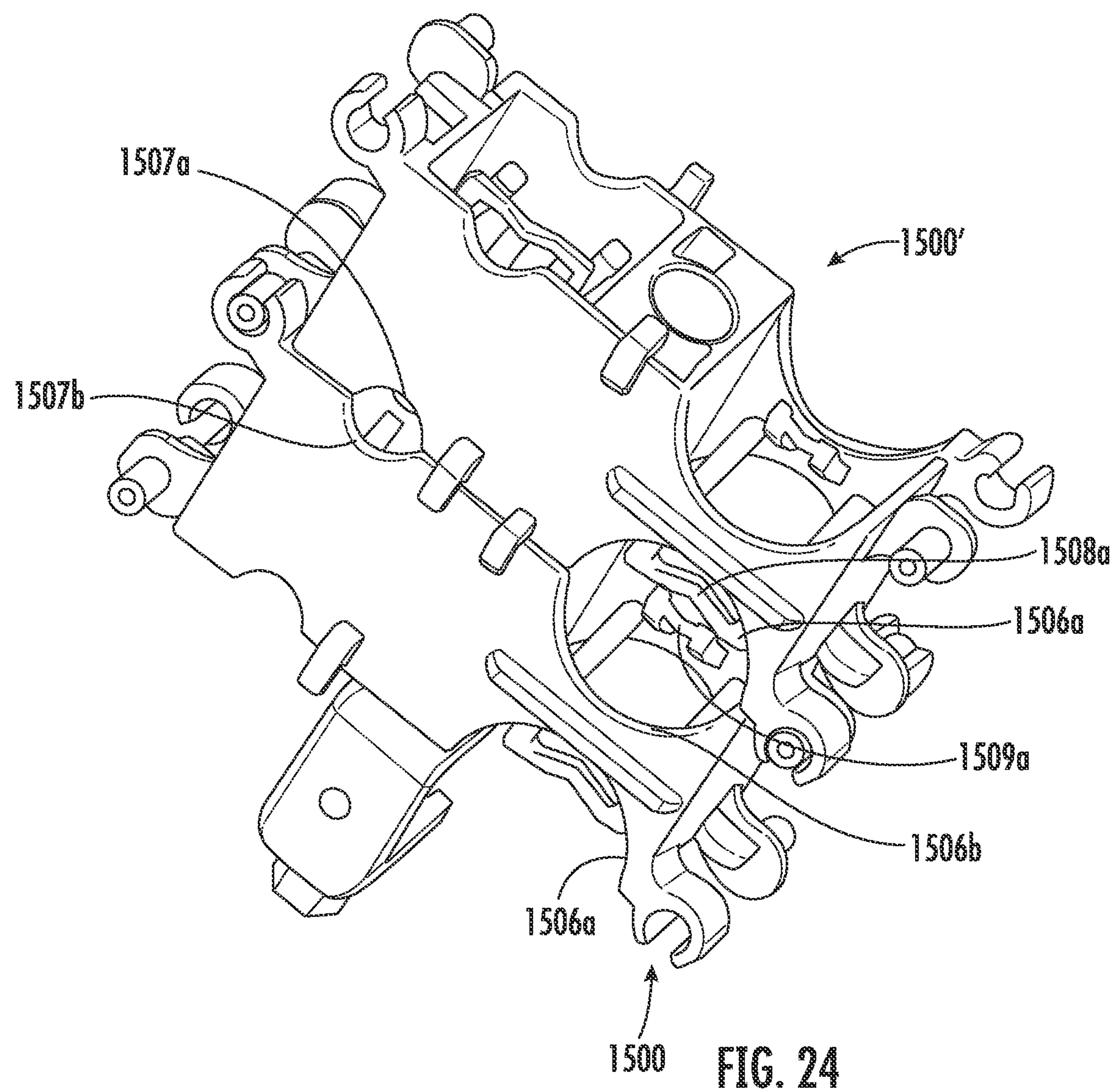
FIG. 24 is a perspective view of two hanger members of FIG. 22 mounted on a C-clamp in a first orientation.

As shown in FIG. 24, multiple cable hangers 1500 can be stacked on one another by inserting the pins 1515*a,* 1516*b* of one cable hanger 1500 into the clips 1517*a,* 1517*b* of another cable hanger 1500'. However, the cable hangers 1500 may be oriented in two different orientations relative to each other, each of which may he suitable for grasping and hanging cables of different sizes. As one example, the cable hangers 1500, 1500' can be oriented in the same orientation, as shown in FIG. 24, such that the large cutout areas 1506*a* of one cable hanger 1500' align with the large cutout areas 1506*b* of the other cable hanger 1500, and the small cutout areas 1507*a* of the cable hanger 1500' align with the small cutout areas 1507*b* of the other cable hanger 1500. In this orientation, the combined cable hangers 1500, 1500' can provide a space for grasping very large cables and another space for grasping much smaller cables, and do so with a large gripping member 1508*a,* 1508*b* and a small gripping member 1509*a,* 1509*b*.

Figure 25:
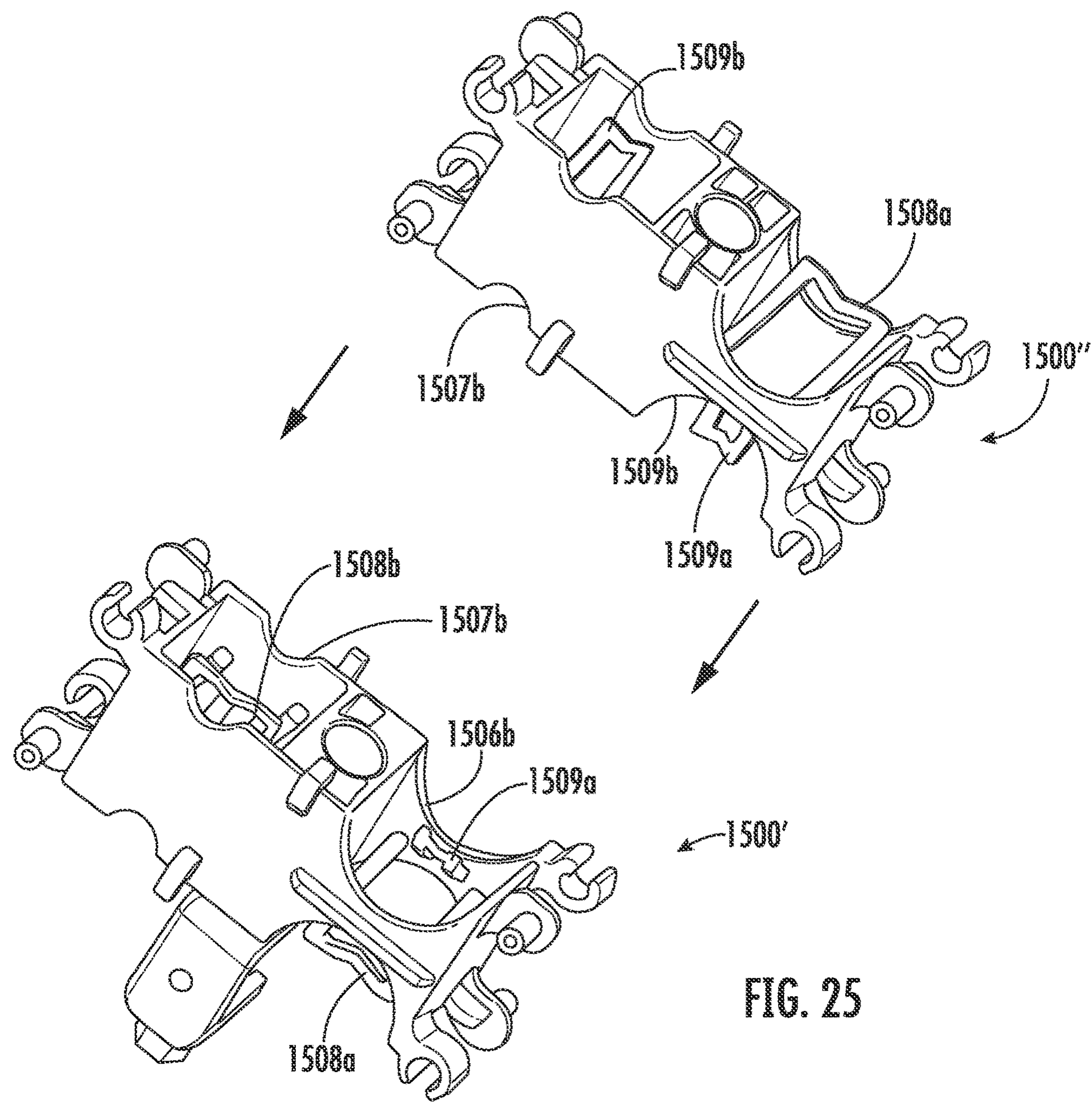
FIG. 25 is an exploded perspective vie he two hanger members of FIG. 22 shown in a second orientation.

Alternatively, and as shown in FIG. 25, in another orientation, the cable hanger 1500" can be rotated about its long axis relative to the cable hanger 1500, with the result that two cable grasping spaces are formed: one which is defined by large cutout areas 1506*a,* 1506*b* and one which is defined by small cutout areas 1507*a,* 1507*b*. In each instance the cable is grasped either by two large gripping members 1508*a,* 1058*b* or two small gripping members 1509*a,* 1509*b*. Thus, this orientation provides additional cable grasping configurations as desired.

Typically, the cable hanger members described herein are formed of a polymeric material, such as acetal, and are formed via injection molding.

The foregoing is illustrative of the present invention and is not to be construed as limiting thereof. Although exemplary embodiments of this invention have been described, those Skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A hanger member for a cable hanger, comprising:

a first side wall having first and second cutout areas;

a second side wall having a third cutout area;

a third side wall having a fourth cutout area;

first and second gripping members extending from the first side wall from locations adjacent, respectively, the first and second cutout areas;

a third gripping member extending from the second side wall from a location adjacent the third cutout area;

a fourth gripping member extending from the third side wall from a location adjacent the fourth cutout area;

wherein the second and third side walls are coplanar; and first and second securing features configured to engage each other, such that a second identical hanger member can be mated to the hanger member to form a cable hanger via engagement of the second securing features of the hanger member with the first securing features of the second identical hanger member;

wherein the first securing features comprise pins, and the second securing features comprises clips that receive the pins.

2. The hanger member defined in claim 1, wherein the second and third side walls are coincident.

3. The hanger member defined in claim 1, wherein the first, second and third side walls are coincident.

4. The hanger member defined in claim 3, wherein first and second cutout areas are laterally aligned, and the third and fourth cutout areas are laterally aligned.

5. The hanger member defined in claim 4, wherein the first and second cutout areas are substantially similar in size.

6. The hanger member defined in claim 4 wherein the first and second cutout areas differ in size.

7. The hanger member defined in claim 1, wherein at least one of the gripping members comprises a skeletal member with a v-shaped cross-member.

8. A hanger member for a cable hanger, comprising:

a first side wall having first and second cutout areas;

a second side wall having a third cutout area;

a third side wall having a fourth cutout area;

first and second cantilevered gripping members extending from the first side wall from locations adjacent, respectively, the first and second cutout areas;

a third cantilevered gripping member extending from the second side wall from a location adjacent the third cutout area;

a fourth cantilevered gripping member extending from the third side wall from a location adjacent the fourth cutout area;

wherein the second and third side walls are coplanar; and first and second securing features configured to engage each other, such that a second identical hanger member can be mated to the hanger member to form a cable hanger via engagement of the second securing features of the hanger member with the first securing features of the second identical hanger member.

9. The cable hanger defined in claim 8, wherein the gripping member has a profile selected from the group consisting of: serpentine, sawtooth, arcuate; and chevron.

10. A hanger member for a cable hanger, comprising:

a first side wall having first, second, third and fourth cutout areas;

a second side wall having a fifth, sixth, seventh and eighth cutout areas;

first, second, third and fourth gripping members extending from the first side wall from locations adjacent, respectively, the first, second, third and fourth cutout areas;

first and second end walls that span the first and second side walls; and first and second clips and first and second pins mounted on the first end wall;

third and fourth clips and third and fourth pins mounted on the second side wall;

wherein each pin defines an axis with a respective clip.

11. The cable hanger member defined in claim 10, wherein the first, second, fifth and sixth cutout areas are large cutout areas, and the third, fourth, seventh and eighth cutout areas are small cutout areas.

12. The cable hanger member defined in claim 11, wherein the first and third gripping members are large gripping members, and the second and fourth gripping members are small gripping members.

13. The hanger member defined in claim 8, wherein the first gripping member comprises a skeletal member.

14. The hanger member defined in claim 13, wherein the first gripping member includes a v-shaped cross-member.

15. The hanger member defined in claim 13, wherein the second gripping member comprises a skeletal member.

* * * * *